United States Patent
Nilsson

(10) Patent No.: US 10,837,338 B2
(45) Date of Patent: Nov. 17, 2020

(54) METHOD AND EXHAUST TREATMENT SYSTEM FOR TREATMENT OF AN EXHAUST GAS STREAM

(71) Applicant: Scania CV AB, Södertälje (SE)

(72) Inventor: Magnus Nilsson, Årsta (SE)

(73) Assignee: Scania CV AB, Södertälje (SE)

( * ) Notice: Subject to any disclaimer, the term of this patent is extended or adjusted under 35 U.S.C. 154(b) by 201 days.

(21) Appl. No.: 15/750,159

(22) PCT Filed: Aug. 26, 2016

(86) PCT No.: PCT/SE2016/050806
§ 371 (c)(1),
(2) Date: Feb. 2, 2018

(87) PCT Pub. No.: WO2017/034470
PCT Pub. Date: Mar. 2, 2017

(65) Prior Publication Data
US 2018/0230877 A1    Aug. 16, 2018

(30) Foreign Application Priority Data
Aug. 27, 2015 (SE) .................. 1551110

(51) Int. Cl.
*F01N 3/20* (2006.01)
*F01N 3/035* (2006.01)
(Continued)

(52) U.S. Cl.
CPC .......... *F01N 3/208* (2013.01); *B01D 53/944* (2013.01); *B01D 53/9418* (2013.01);
(Continued)

(58) Field of Classification Search
CPC .......... B01D 2255/904; B01D 53/9418; B01D 53/944; B01D 53/9477; B01D 53/9495;
(Continued)

(56) References Cited

U.S. PATENT DOCUMENTS 5,120,695 A   6/1992   Blumrich et al.
5,239,860 A   8/1993   Harris et al.
(Continued)

FOREIGN PATENT DOCUMENTS

CN   101932803 A   12/2010
CN   104847460 A   8/2015
(Continued)

OTHER PUBLICATIONS

Russian Office Action and Search Report for Russian Patent Application No. 2018109515 dated Dec. 29, 2018.
(Continued)

*Primary Examiner* — Anthony Ayala Delgado
(74) *Attorney, Agent, or Firm* — Moore & Van Allen PLLC; W. Kevin Ransom

(57) ABSTRACT

Methods and systems are provided for treatment of an exhaust stream, comprising nitrogen oxides. The method comprises a first oxidation of compounds comprising one or more of nitrogen, carbon and hydrogen in the exhaust stream; and a control of a first supply of a first additive to the exhaust stream to prevent an accumulation of soot exceeding a soot threshold value in a catalytic filter. This soot threshold value depends at least on operating conditions for the combustion engine, which impact a level of a flow for the exhaust stream. A first reduction of nitrogen oxides is performed using reduction characteristics of a catalytic coating in the catalytic filter and the supplied first additive. Soot particles are caught and oxidized. A control of a second supply of a second additive is performed, following which a second reduction of nitrogen oxides is performed using the first and/or the second additive in a reduction catalyst device.

54 Claims, 5 Drawing Sheets

(51) Int. Cl.
| | |
|---|---|
| *F01N 3/10* | (2006.01) |
| *F01N 3/023* | (2006.01) |
| *F01N 13/00* | (2010.01) |
| *B01D 53/94* | (2006.01) |
| *F01N 3/029* | (2006.01) |
| *F01N 3/08* | (2006.01) |
| *F01N 11/00* | (2006.01) |

(52) U.S. Cl.
CPC ..... *B01D 53/9477* (2013.01); *B01D 53/9495* (2013.01); *F01N 3/023* (2013.01); *F01N 3/0293* (2013.01); *F01N 3/035* (2013.01); *F01N 3/0814* (2013.01); *F01N 3/103* (2013.01); *F01N 3/106* (2013.01); *F01N 3/2066* (2013.01); *F01N 11/002* (2013.01); *F01N 11/007* (2013.01); *F01N 13/009* (2014.06); *B01D 2255/904* (2013.01); *F01N 2510/06* (2013.01); *F01N 2560/026* (2013.01); *F01N 2560/06* (2013.01); *F01N 2560/14* (2013.01); *F01N 2570/14* (2013.01); *F01N 2610/02* (2013.01); *F01N 2610/1406* (2013.01); *F01N 2610/1433* (2013.01); *F01N 2900/08* (2013.01); *Y02A 50/2325* (2018.01); *Y02T 10/24* (2013.01)

(58) Field of Classification Search
CPC ............... F01N 13/009; F01N 2510/06; F01N 2610/02; F01N 2610/1406; F01N 3/0293; F01N 3/103; F01N 3/208
See application file for complete search history.

(56) References Cited

U.S. PATENT DOCUMENTS

| | | | |
|---|---|---|---|
| 8,544,260 B2 | 10/2013 | Boorse et al. | |
| 9,670,855 B2 | 6/2017 | Dickson et al. | |
| 2004/0040289 A1 | 3/2004 | Mazur et al. | |
| 2004/0098979 A1 | 5/2004 | Hammerle et al. | |
| 2005/0069476 A1 | 3/2005 | Blakeman et al. | |
| 2005/0232830 A1 | 10/2005 | Bruck | |
| 2006/0010857 A1 | 1/2006 | Hu et al. | |
| 2006/0039843 A1 | 2/2006 | Patchett et al. | |
| 2007/0122317 A1 | 5/2007 | Driscoll et al. | |
| 2007/0150154 A1 | 6/2007 | Lenz | |
| 2008/0060348 A1 | 3/2008 | Robel et al. | |
| 2009/0031702 A1 | 2/2009 | Robel | |
| 2009/0035194 A1 | 2/2009 | Robel et al. | |
| 2009/0035195 A1 | 2/2009 | Robel | |
| 2009/0193794 A1* | 8/2009 | Robel | F02M 26/15 60/295 |
| 2010/0024393 A1 | 2/2010 | Chi et al. | |
| 2010/0175372 A1 | 7/2010 | Lambert et al. | |
| 2010/0252737 A1 | 10/2010 | Fournel et al. | |
| 2010/0319320 A1 | 12/2010 | Mital et al. | |
| 2011/0162347 A1 | 7/2011 | Katare et al. | |
| 2011/0167805 A1* | 7/2011 | Chen | F01N 3/023 60/286 |
| 2011/0211193 A1 | 9/2011 | Saveliev et al. | |
| 2011/0271664 A1 | 11/2011 | Boorse et al. | |
| 2011/0295484 A1 | 12/2011 | L'Henoret | |
| 2011/0313635 A1 | 12/2011 | Blanc et al. | |
| 2012/0117954 A1 | 5/2012 | Yasui et al. | |
| 2012/0255286 A1 | 10/2012 | Matsunaga et al. | |
| 2013/0078173 A1 | 3/2013 | Cox | |
| 2013/0116881 A1 | 5/2013 | Bogema et al. | |
| 2013/0232958 A1* | 9/2013 | Ancimer | F01N 3/208 60/301 |
| 2013/0289857 A1 | 10/2013 | Schmitt et al. | |
| 2013/0291520 A1* | 11/2013 | Schiavone | F02D 41/029 60/274 |
| 2014/0052353 A1 | 2/2014 | Sujan et al. | |
| 2014/0056789 A1 | 2/2014 | Mussmann et al. | |
| 2014/0229010 A1 | 8/2014 | Farquharson et al. | |
| 2015/0020506 A1 | 1/2015 | Johansen | |
| 2015/0023853 A1 | 1/2015 | Wittrock et al. | |
| 2015/0033715 A1 | 2/2015 | Markatou et al. | |
| 2015/0047348 A1* | 2/2015 | Osumi | F01N 3/103 60/605.2 |
| 2015/0059317 A1* | 3/2015 | Mital | F01N 3/208 60/274 |
| 2015/0068197 A1* | 3/2015 | Swoish | B01D 53/9495 60/286 |
| 2015/0131093 A1 | 5/2015 | Saptari | |
| 2015/0143798 A1 | 5/2015 | Lee | |
| 2015/0198076 A1* | 7/2015 | Li | F01N 3/106 60/274 |
| 2015/0204226 A1 | 7/2015 | Moore | |
| 2015/0231564 A1 | 8/2015 | Wittrock et al. | |
| 2015/0231565 A1 | 8/2015 | Wittrock et al. | |
| 2015/0283507 A1 | 10/2015 | Schraml et al. | |
| 2015/0337702 A1 | 11/2015 | Ettireddy et al. | |
| 2016/0201533 A1 | 7/2016 | Upadhyay et al. | |

FOREIGN PATENT DOCUMENTS

| | | |
|---|---|---|
| DE | 3733501 A1 | 4/1989 |
| DE | 102006031650 A1 | 1/2008 |
| DE | 102008026191 A1 | 1/2009 |
| DE | 102009049521 A1 | 7/2010 |
| DE | 102009038835 A1 | 3/2011 |
| DE | 102010050312 A1 | 5/2012 |
| DE | 102012201809 A1 | 9/2012 |
| DE | 102014019427 A1 | 8/2015 |
| DE | 102015015260 A1 | 6/2017 |
| EP | 1181531 A1 | 2/2002 |
| EP | 2390480 A1 | 11/2011 |
| EP | 2597279 A1 | 5/2013 |
| FR | 2956039 A1 | 8/2011 |
| KR | 20140143145 | 12/2014 |
| RU | 2548997 A | 1/2014 |
| WO | 2006008625 A1 | 1/2006 |
| WO | 2007104382 A1 | 9/2007 |
| WO | 2007145548 A1 | 12/2007 |
| WO | 2009017597 A1 | 2/2009 |
| WO | 2009017639 A1 | 2/2009 |
| WO | WO2011077168 A1 | 6/2011 |
| WO | 2011102781 A1 | 8/2011 |
| WO | 2011133092 A1 | 10/2011 |
| WO | 2012037342 A1 | 3/2012 |
| WO | 2013022516 A1 | 2/2013 |
| WO | 2013095214 A1 | 6/2013 |
| WO | 2013100846 A1 | 7/2013 |
| WO | 2014014399 A1 | 1/2014 |
| WO | 2014016616 A1 | 1/2014 |
| WO | 2014044318 A1 | 3/2014 |
| WO | 2014149297 A1 | 9/2014 |
| WO | 2015048099 A1 | 4/2015 |

OTHER PUBLICATIONS

Scania CV AB, International Application No. PCT/SE2016/050806, International Preliminary Report on Patentability, dated Feb. 27, 2018.
Scania CV AB, European Application No. 16839710.7, Extended European Search Report, dated Jan. 4, 2019.
Scania CV AB, Korean Application No. 10-2018-7007508, Office Action, dated May 27, 2019.
Scania CV AB, Chinese Application No. 201680048185.0, First Office Action, dated Jul. 16, 2019.
Botar-Jid, Claudiu Cristian (2007)—Selective catalytic reduction of nitrogen oxides with ammonia in forced unsteady state reactors—Case based reasoning and mathematical model simulation reasoning; Retrieved online from http://um.fi/URN:ISBN:978-952-214-469-0; p. 3, second paragraph.
NOx Controls; EPA/452/B-02-001 Section 4—Retrieved online on Jun. 5, 2015 from http://www.epa.gov/ttncatcl/dirl/cs4-2ch2.pdf; pp. 2-6, third paragraph.
International Search Report for PCT/SE2016/050806 dated Oct. 27, 2016.

(56) References Cited

OTHER PUBLICATIONS

Written Opinion of the International Searching Authority for PCT/SE2016/050806 dated Oct. 27, 2016.
Scania CV AB, European Application No. 16839710.7, Communication pursuant to Article 94(3) EPC, dated Jan. 16, 2020.
Scania CV AB, Chinese Application No. 201680048185.0, Second Office Action, dated Mar. 2, 2020.

* cited by examiner

METHOD AND EXHAUST TREATMENT SYSTEM FOR TREATMENT OF AN EXHAUST GAS STREAM

CROSS-REFERENCE TO RELATED APPLICATION(S)

This application is a national stage application (filed under 35 § U.S.C. 371) of PCT/SE2016/050806, filed Aug. 26, 2016 of the same title, which, in turn claims priority to Swedish Application No. 1551110-8, filed Aug. 27, 2015 of the same title; the contents of each of which are hereby incorporated by reference.

FIELD OF THE INVENTION

The present invention relates to a method, an exhaust treatment system, and a computer program product arranged for treatment of an exhaust stream.

BACKGROUND OF THE INVENTION

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in for example vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and/or standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammoniac $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency. Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides $NO_x$ is then carried out in the exhaust treatment system, which thus may comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

SUMMARY OF THE INVENTION

To a certain extent, the performance of the exhaust treatment may be improved by increasing the substrate volumes comprised in the exhaust treatment system. In particular, the losses due to an uneven distribution of the exhaust flow may be reduced. However, larger substrate volumes result in a direct impact on the cost of manufacture and/or production. A larger substrate volume also results in a greater back pressure, which counteracts potential gains in fuel consumption, due to the higher conversion degree caused by the increased volume. It is thus important to be able to use the exhaust treatment system optimally, for example by avoiding over-sizing and/or by limiting the exhaust treatment system's spread in terms of size and/or manufacturing cost.

There are also prior art exhaust treatment systems comprising a catalytic particulate filter SCRF, such as WO2014044318. A catalytic particulate filter is a filter comprising a catalytic coating, with the characteristic that the coating may be used for reduction of nitrogen oxides $NO_x$. However, these prior art exhaust treatment systems often experience problems relating to an insufficient soot oxidation in the catalytic filter SCRF. These problems are due at least partly to the fact that the reactions comprised in the reduction of nitrogen oxides $NO_x$ are faster than the reactions comprised in the soot oxidation.

Overall, this means that it is difficult to find a solution to achieve both an optimized fuel consumption, and an efficient exhaust treatment. This means that it becomes very important to be able to use the system in as optimal a manner as possible, with respect to both fuel consumption and exhaust treatment. There is accordingly a need for an optimization of the function in exhaust treatment systems.

Therefore, one objective of the present invention is to provide a method and a system, which may provide an optimization of the function of today's exhaust treatment systems and thus a high performance, and a good function, under varying conditions.

According to the present invention a method and an exhaust treatment system are provided for treatment of an exhaust stream, which results from a combustion in a combustion engine. The exhaust stream comprises among others nitrogen oxides $NO_x$, including at least nitrogen monoxide NO and nitrogen dioxide $NO_2$.

A first oxidation of compounds, comprising one or more of nitrogen, carbon and hydrogen, in the exhaust stream is carried out by a first oxidation catalyst arranged in the exhaust treatment system.

A control of a first supply of a first additive into the exhaust stream is carried out with the use of a first dosage device, arranged downstream of the first oxidation catalyst. This control of the first supply is carried out with the objective of preventing an accumulation of soot exceeding a soot threshold value $S_{th}$ in a catalytic filter arranged downstream of the first dosage device. Said soot threshold value $S_{th}$ depends on at least one or more operating conditions for the combustion engine, which impact a level for a flow of said exhaust stream.

A first reduction of nitrogen oxides $NO_x$ in the exhaust stream is carried out with the use of reduction characteristics of an at least partly catalytic coating comprised in the catalytic filter, and with the use of the supplied first additive.

With the use of the catalytic filter, soot particles in the exhaust stream are caught and oxidized.

A control of a second supply of a second additive into the exhaust stream is carried out with the use of a second dosage device, arranged downstream of the catalytic filter.

A second reduction of nitrogen oxides $NO_x$ in the exhaust stream is then carried out with the use of at least one of the first and the second additives in a reduction catalyst device, arranged downstream of the second dosage device.

The active control of the first reduction may, according to different embodiments of the present invention, be carried out through an active control of a first administration of a first additive with the first dosage device. Said active control of the first administration of the first additive is carried out, according to the present invention, in such a manner that a sufficient $NO_2$-based soot oxidation may take place in the catalytic filter, which means that the soot oxidation in the catalytic filter may be controlled.

Accordingly, according to the present invention the first supply of the first dosage substance is controlled so that relatively little additive is administered, which means that not all nitrogen dioxide $NO_2$ available in the exhaust stream is consumed at the reduction of nitrogen oxides $NO_x$ in the catalytic filter. In other words, the first supply of the first additive is controlled so that nitrogen dioxide $NO_2$ is normally available for soot oxidation in the catalytic filter. Thus, the present invention provides a solution to the problem of insufficient passive $NO_2$-based soot oxidation experienced by the catalytic filter.

It should be noted that the use of the first supply of additive and the catalytic filter, in combination with a second supply of a second additive and the reduction catalyst device downstream of the catalytic filter in the exhaust treatment system, facilitates this under-administration of the first additive. The double possibilities of reduction of nitrogen oxides, in the catalytic filter as well as in the reduction catalyst device, entail that not all nitrogen dioxide $NO_2$ needs to be eliminated in the catalytic filter. The surplus of nitrogen dioxide $NO_2$ may then be used to oxidize the soot stored in the catalytic filter.

The configuration of the exhaust treatment system according to the present invention thus facilitates, thanks to its double possibilities of reduction of nitrogen oxides $NO_x$, an improved soot oxidation in the catalytic filter, since a sufficient $NO_2$-based soot oxidation may be ensured.

Additionally, according to some embodiments of the invention, an active control of an exhaust environment may be carried out, comprising, for example, a temperature for the exhaust stream at the catalytic filter. The exhaust environment may here, for example, be oxidizing, with good access to air, or it may be reducing, with poorer access to air. Fuel injection into the engine may thus impact the exhaust environment.

The active control of the temperature may, according to different embodiments of the present invention, be controlled by adjusting the air/fuel-ratio (the lambda value) in the combustion engine, wherein a reduced air flow increases the temperature, and an increased air flow reduces the temperature. The air/fuel ratio may, for example, be changed by changing the combustion mode of the engine.

The air flow through, and accordingly also the temperature for, the exhaust treatment system may also be controlled by controlling a gearbox in the vehicle, since the use of different gears results in different air flows through the exhaust treatment system.

The present invention provides, according to one embodiment, a control of a ratio $NO_2/NO_x$, between the amount of nitrogen dioxide $NO_2$ and the amount of nitrogen oxides $NO_x$. Thus, for example, too high values for this ratio may be avoided through the active control, wherein for example $NO_2/NO_x > 50\%$ may be avoided, since the value for the ratio may be actively controlled to be reduced. The value for the ratio $NO_2/NO_x$ may also be increased when the value is too low, for example if $NO_2/NO_x < 50\%$.

The present invention also has an advantage in that two cooperating dosage devices are used in combination for the administration of an additive/reductant, for example urea, upstream of the catalytic filter and the reduction catalyst devices, which relieves and facilitates mixture and potential evaporation of the additive, since the injection of the additive is divided between two physically separate positions. This reduces the risk of the additive cooling down the exhaust treatment system locally, which may potentially form deposits at the positions where the additive is injected, or downstream of such positions.

BRIEF DESCRIPTION OF THE DRAWINGS

The invention will be illustrated in more detail below, along with the enclosed drawings, where similar references are used for similar parts, and where.

DETAILED DESCRIPTION OF THE INVENTION

Figure 1:
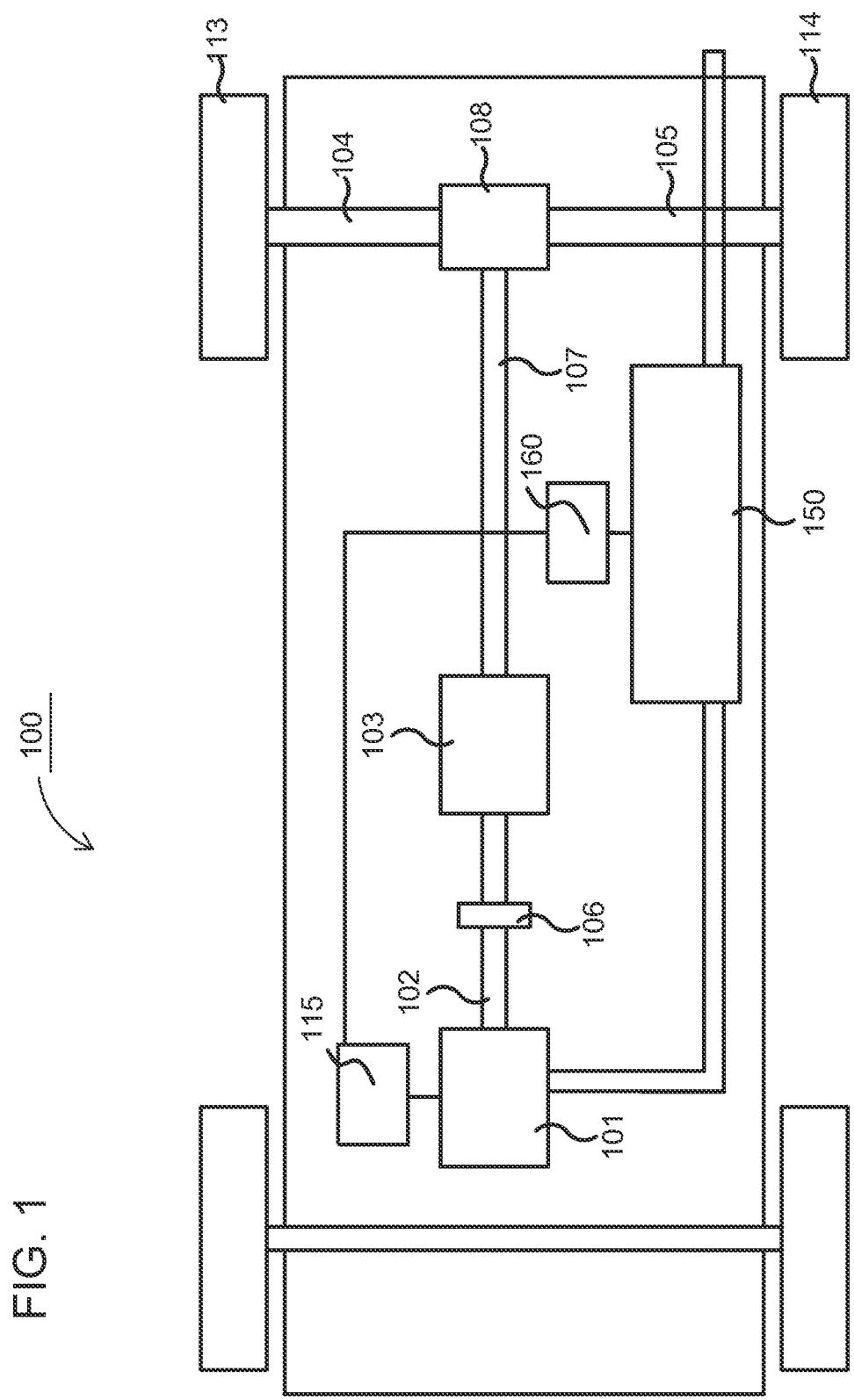
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the vehicle's control system via a control device 115. Likewise, the clutch 106 and the gearbox 103 may be controlled by the vehicle's control system, with the help of one or more applicable control devices (not shown). Naturally, the vehicle's powertrain may also be of another type, such as a type with a conventional automatic gearbox, of a type with a hybrid power-train, etc.

An output shaft 107 from the gearbox 103 drives the wheels 113, 114 via a final drive 108, such as e.g. a customary differential, and the drive shafts 104, 105 connected to said final drive 108.

The vehicle 100 also comprises an exhaust treatment system/exhaust purification system 150 for treatment/purification of exhaust emissions resulting from combustion in the combustion chambers, which may consist of cylinders, of the combustion engine 101. The exhaust treatment system 150 may be controlled by the vehicle's control system via a control device 160, which may also be connected to the engine, and/or to an engine control device 115.

Figure 2:
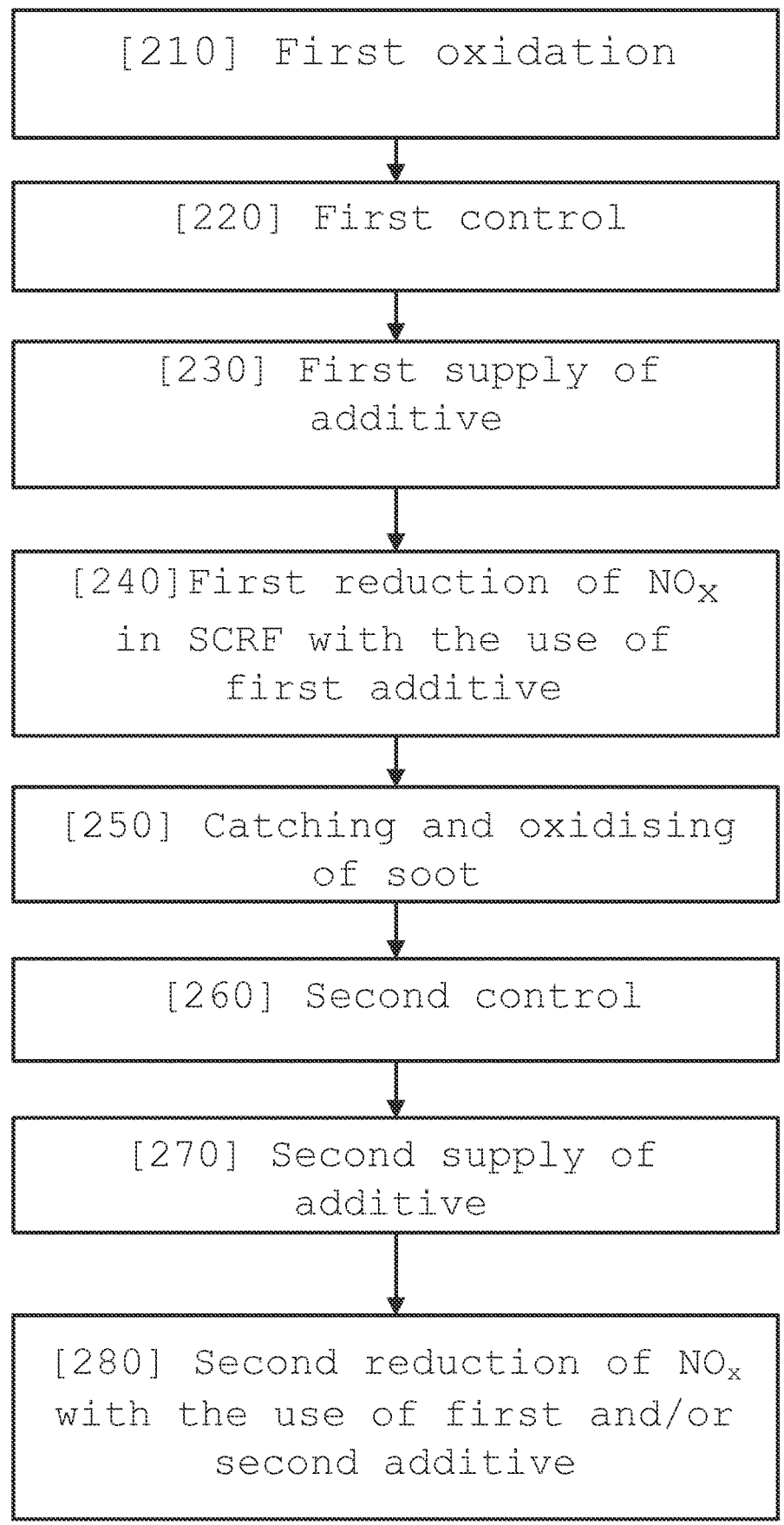
FIG. 2 shows a flow chart for the method for exhaust treatment according to the invention.

According to the present invention, a method is provided for the treatment of an exhaust stream, which results from a combustion in a combustion engine and comprises nitrogen oxides $NO_x$. As mentioned above, nitrogen oxides $NO_x$ comprise nitrogen monoxide NO and nitrogen dioxide $NO_2$. This method may be illustrated with the flow chart in FIG. 2.

In a first step 210 of the method, a first oxidation of compounds comprising one or more of nitrogen, carbon and hydrogen in the exhaust stream is carried out by a first oxidation catalyst, arranged in the exhaust treatment system.

In a second step 220 of the method, a control of a first supply of a first additive into the exhaust stream is determined. The control determined with the objective of preventing an accumulation of soot exceeding a soot threshold value $S_{th}$ in a catalytic filter, arranged downstream of a first dosage device which supplies the first additive. A permitted accumulated amount of soot in the catalytic filter over time, that is to say the soot threshold value $S_{th}$, depends at least on operating conditions for the combustion engine in the vehicle, which impact a level of a flow an exhaust stream through the exhaust treatment system.

The fact that the control is carried out with the objective of preventing an accumulation of soot exceeding a threshold value $S_{th}$ may in this document comprise a control of the first supply toward the soot threshold value $S_{th}$, or a control of the first supply toward an interval around the soot threshold value $S_{th}$.

These operating conditions may, according to one embodiment, consist of current measured, modelled and/or predicted operating conditions for the combustion engine. Predicted values may be determined based on a representation of a road section ahead of the vehicle, where the representation may be based, for example, on positioning information, such as GPS-information, and map data. The operating conditions described in this document, and therefore also the flow and/or the soot threshold value $S_{th}$, may, according to one embodiment, be averaged. For example, a sliding average, an average for a certain time period and a certain type of operation, or a future predicted average determined for the soot threshold value $S_{th}$, the flow and/or the operating conditions, may be used. Average values for the soot threshold value $S_{th}$, the flow and/or the operating conditions may also be determined based, for example, on historical data for an individual vehicle, for a vehicle type and/or for an operating type.

In a third step 230 of the method, this first additive is supplied into the exhaust stream by control of a first dosage device, arranged downstream of the first oxidation catalyst, according to the determined control.

In a fourth step 240 of the method, a first reduction of at least the first amount of nitrogen oxides $NO_{x\_1}$ is carried out with the use of reduction characteristics in an at least partly catalytic coating in a catalytic filter, arranged downstream of the first dosage device. This catalytic filter consists of a particulate filter with an at least partly catalytic coating with reduction characteristics, which provides a catalytic reaction. The catalytic filter is often referred to herein as SCRF.

The catalytic filter is arranged to catch and oxidize soot particles in a fifth step 250 of the method, and to carry out the first reduction of nitrogen oxides $NO_x$. The catalytic reaction uses the first additive and the reduction characteristics of the at least partly catalytic coating.

The active control of the first supply 230 of the first additive, according to the present invention, thus results in an active control of the first reduction 240 of the amount of nitrogen oxides $NO_x$, which reduction is carried out in the catalytic filter. This first reduction 240 of the amount of nitrogen oxides NO may be achieved through the first additive reacting with the first amount of nitrogen oxides $NO_x$ at the at least partly catalytic coating in the catalytic filter SCRF.

This first reduction 240 may also be achieved through nitrogen dioxide $NO_2$, which is comprised in the nitrogen oxides $NO_x$, reacting with soot particles at oxidation of the soot particles in the catalytic filter. The active control of the first supply 230 of the first additive is in this case based at least on an amount of soot in the catalytic filter.

As a non-limiting example, the control may here be carried out in such a way that the administration of the first additive very rarely corresponds to an $NO_x$-conversion exceeding the value for twice the ratio between the fraction of nitrogen dioxide $NO_2$ and the fraction of nitrogen oxides $NO_x$, that is to say that the dosage of the first additive corresponds to an $NO_x$-conversion less than $(NO_2/NO_x)*2$. If, for example, $NO_2/NO_x=30\%$, the dosage of the first additive may be controlled to correspond to an $NO_x$-conversion smaller than 60% (2*30%=60%), for example an $NO_x$-conversion equal to approximately 50%, which would guarantee that the reaction speed over the catalytic filter 320 is fast, and that 5% of nitrogen dioxide $NO_2$ remains for $NO_2$-based soot oxidation through the catalytic filter 320.

In a sixth step 260 of the method, a control of a second supply of a second additive into the exhaust stream is determined.

In a seventh step 270 of the method, a second additive is supplied into the exhaust stream, with the use of a second dosage device arranged downstream of the catalytic filter.

In an eight step 280 of the method a second reduction of nitrogen oxides $NO_x$ is carried out in the exhaust stream, with the use of at least one of the first and the second additive, in a reduction catalyst device arranged downstream of the second dosage device.

This active control of the first administration of the first additive is carried out, according to the present invention, in such a manner that a sufficient/required $NO_2$-based soot oxidation may take place in the catalytic filter, which means that the soot oxidation in the catalytic filter may be controlled. This may also be expressed as this active control of the first administration of the first additive being carried out in such a manner, that a required/wanted/requested soot oxidation based on nitrogen dioxide $NO_2$ is obtained in the catalytic filter. In other words, the objective of the active control is, over time, that is to say in total over a time interval, to be able to oxidize as much soot as the combustion engine produces. This is achieved by way of the first supply of the first dosage substance, in such a manner that relatively little additive is administered, that is to say less additive than what would be required to eliminate all nitrogen dioxide $NO_2$ in the filter. Thus, the required soot oxidation may be obtained, so that soot accumulation in the filter may be controlled, and also may be kept below the soot threshold value $S_{th}$, at least seen over a certain time period.

For prior art exhaust treatment systems, such as, for example, a Euro VI-system, such an under-administration of additive would be completely impossible to carry out, since the unreduced amount of nitrogen dioxide would then be emitted into the atmosphere. For the exhaust treatment system according to the present invention, such an under-administration is, however, possible, since a second supply of a second additive and a reduction catalyst device is arranged downstream of the catalytic filter in the exhaust treatment system. The double possibilities for reduction of nitrogen oxides, partly in the catalytic filter and partly in the reduction catalyst device, mean that not all nitrogen dioxide $NO_2$ needs to be eliminated in the catalytic filter, as long as the residue of nitrogen dioxide $NO_2$ is reduced in the reduction catalyst arranged downstream. The excess nitrogen dioxide $NO_2$ in the catalytic filter may then be used to oxidize the soot stored in the catalytic filter.

There are a number of operating conditions for the combustion engine, which may affect the level of the exhaust stream's flow. These operating conditions may, for example, comprise a torque emitted by the combustion engine, a power output from the combustion engine and/or an exhaust gas recirculation level (EGR-level) for the combustion engine. The level of the exhaust stream's flow may also be impacted by a function of a gas exchange configuration, comprising, for example, a Variable Geometry Turbo (VGT) used by the combustion engine. The level of the exhaust stream's flow may also be impacted by a function of an exhaust brake acting on the exhaust stream and/or of an inlet damper/throttle, which impacts an air intake into the combustion engine. The level of the exhaust stream's flow may also be impacted by a state, comprising a state or a service status, such as, for example, a clogging degree of an air filter, of the combustion engine.

According to one embodiment of the present invention, the soot threshold value $S_{th}$ is determined based on the above one or several operating conditions, as a soot threshold value $S_{th}$ is granted a smaller value for one or several operating conditions resulting in a higher level of the flow, and a greater value for one or several operating conditions resulting in a lower level of the flow. For example, the soot threshold value $S_{th}$ would here be given a lower value for a truck carrying heavy loads over long distances at a high speed on motorways, which results in a high average value for the flow, than it would be given for a vehicle, such as a garbage truck, a bus or a distribution vehicle, which has a lower average value for the flow at normal operation, for example due to repeated stops.

Vehicles with a lower average value for the flow are generally less sensitive to the impact of the filter back pressure on the fuel consumption than vehicles with a high average value for the flow, which is why a higher soot threshold value $S_{th}$ may be used for vehicles with a lower average value for the flow. This also results in more degrees of freedom for the reduction of nitrogen oxides $NO_x$ in the exhaust treatment system of vehicles with a lower average value for the flow. Vehicles with a higher average value for the flow, on the other hand, are sensitive to the filter back pressure's impact on fuel consumption, and accordingly the soot threshold value $S_{th}$ is suitably set at a lower value for these vehicles.

The level of the flow, which may for example consist of an averaged value as mentioned above, is often related to an impact of the accumulation of soot in the filter on a fuel consumption of the combustion engine. The accumulation of soot normally has a greater impact on the fuel consumption at a high level of the flow than at a low level of the flow, wherein the high and the low values may consist of average values, as mentioned above.

The soot threshold value $S_{th}$ may, according to one embodiment, in other words be based on a weight of the vehicle, a use of the vehicle and/or a progression of the vehicle by a driver driving the vehicle.

According to one embodiment of the present invention, the determination of the soot threshold value $S_{th}$ is also based on one or several operating conditions for the exhaust treatment system. These operating conditions may, for example, comprise a state, such as a condition or a service-status, for the catalytic filter. In relation to, for example, an aged, worn or at least partly broken filter, such as a filter with cracks, a lower soot threshold value $S_{th}$ may be set, in order to reduce the risk of the filter breaking at a regeneration. Similarly, the determination of the soot threshold value $S_{th}$ may be impacted by a state/condition/service-status for one or several components, described herein, in the exhaust treatment system. A deteriorated/aged state for one or several components may then result in a lower value for the soot threshold value $S_{th}$ than a better/newer state would have resulted in, since components in a deteriorated/aged state should not be made to work as hard.

According to one embodiment of the present invention, the determination of the soot threshold value $S_{th}$ shall be carried out in such a way, that the determination results in a soot threshold value $S_{th}$ that is smaller/lower than a maximum physical filling level for the catalytic filter. This ensures that the filter is not damaged, for example at regeneration.

According to one embodiment of the present invention, one or several additional operating conditions for the combustion engine may impact the control of the supply of additive in the exhaust treatment system. Accordingly, the control of the first supply and/or the control of the second supply may depend on these one or several additional operating conditions for the combustion engine. Such an additional operating condition may comprise a fuel type operating the combustion engine, since different fuel types such as diesel and biodiesel result in different amounts of soot being produced in the combustion engine. An operating mode used for the combustion engine, such as a used EGR-level, may also be comprised in the one or several additional operating conditions, since different operating modes, such as different EGR-levels, result in different soot levels out from the combustion engine. An altitude, i.e. a height over the sea, at which the combustion engine operates, may also be comprised in the one or several additional operating conditions, since the altitude may impact the soot production in the combustion engine. By having regard to these one or several additional operating conditions, regard is also had to soot production in the combustion engine at control, resulting in a better optimized control of the supply of additive in the exhaust treatment system According to one embodiment of the present invention, the control of the first supply and/or the control of the second supply is also based on a total reduction of nitrogen oxides $NO_x$ for the exhaust treatment system. This ensures that a required reduction of nitrogen oxides $NO_x$ is provided by the exhaust treatment system so that, for example, emission requirements in emission standards may be met.

According to one embodiment of the present invention, the soot threshold value $S_{th}$ is given a size entailing that the control 220 of the first supply 230 of the first additive results in nitrogen dioxide $NO_2$ being available in the catalytic filter, except for time limited special operating conditions for the combustion engine. As mentioned above, the nitrogen dioxide $NO_2$ may be used to facilitate oxidation of soot particles in the catalytic filter. One example of such a time limited special operating condition may be one or several transient operating conditions for the combustion engine, and/or operating conditions in connection with increased power output and/or cold start.

Thus, the nitrogen dioxide $NO_2$ in the catalytic filter may be allowed to decrease in the filter, for example in connection with an acceleration, an uphill slope, or similar time limited operating conditions. Likewise, the nitrogen dioxide $NO_2$ in the catalytic filter may be permitted to decrease in the filter during time limited periods in connection with cold starts. This may also be expressed as the time limited special operating conditions comprise operating modes, for which the first reduction 240 of nitrogen oxides $NO_x$ is given a higher priority than the oxidation of soot particles in the filter. At normal operation of the vehicle/combustion engine, however, it will be possible to grant higher priority to the oxidation of soot particles in the filter than to the first reduction 240 of nitrogen oxides NO when the exhaust treatment system according to the present invention is used, since there is an additional possibility of reduction of nitrogen oxides $NO_x$ in the system, in the form of the reduction catalyst device downstream of the catalytic filter. Thus, the catalytic filter does not always have to prioritize the first reduction 240 of nitrogen oxides $NO_x$, since nitrogen oxides NO passing through the catalytic filter may be reduced in the reduction catalyst device arranged downstream. This configuration of the exhaust treatment system according to the present invention thus provides the catalytic filter with extra degrees of freedom for the first reduction 240 of nitrogen oxides $NO_x$, which are used to achieve an improved soot oxidation in the filter over time.

According to one embodiment, the time limited operating conditions in connection with the transient operating conditions, increased power output and/or cold start, comprise a time period just before the transient operating conditions, increased power output and/or cold start occur, which means that the administration of additive may be carried out proactively to meet the future requirement. The future requirement may here be predicted and/or estimated suitably, for example by estimation based on information on the road section ahead, for example based on GPS-information and map data. The time period just before the transient operating conditions, the increased power output and/or the cold start occurs may here have a duration that facilitates the proactive administration being completed before the transient operating conditions, the increased power output and/or the cold start occurs.

The time limited special operating conditions are, according to one embodiment of the present invention, so limited in time that the accumulation of soot exceeding a soot threshold value $S_{th}$ over time may be avoided. This is possible because nitrogen dioxide $NO_2$, which may be used to facilitate the oxidation of soot particles in the filter, is available in the catalytic filter, except when these time limited special operating conditions prevail. In other words, it may thus be ensured that an uncontrolled accumulation of soot in the filter is prevented, since an effective $NO_2$-based soot oxidation may, as a rule, be provided, wherein such effective $NO_2$-based soot oxidation is only interrupted by briefer periods with less access to nitrogen dioxide $NO_2$ in the filter.

According to one embodiment of the present invention, the soot threshold value $S_{th}$ is given a size entailing that the control 220 of the first supply 230 of the first additive results in nitrogen dioxide $NO_2$, which may be used to facilitate oxidation of soot particles in the catalytic filter, being substantially always available in this catalytic filter. This ensures a good soot oxidation in the filter.

According to one embodiment of the present invention, the method further comprises a second oxidation of compounds comprising one or more of nitrogen, carbon and hydrogen in the exhaust stream. The second oxidation may, according to one embodiment, be carried out by a second oxidation catalyst, arranged downstream of the catalytic filter. The second oxidation may also, according to another embodiment, be carried out by the at least partly catalytic coating that is comprised in the catalytic filter, wherein the catalytic coating in this case, apart from its reduction characteristics, also has oxidation characteristics.

The first oxidation catalyst and/or the second oxidation catalyst may create heat for components fitted downstream in the exhaust treatment system, such as for the catalytic filter and/or for the reduction catalyst device.

According to one embodiment of the present invention, the combustion engine is controlled to create heat, which may be used for heating of at least one of the first oxidation catalyst and the catalytic filter. Thus, the catalytic filter may reach a desirable predetermined performance for conversion of nitrogen oxides $NO_x$, since the conversion of nitrogen oxides $NO_x$ depends on the temperature.

According to one embodiment of the present invention, at least one of the first supply 230 of the first additive and the second supply 270 is controlled by the second additive, which is supplied to the exhaust stream with the use of the first dosage device and the second dosage device, respectively, as described above, so that the supply increases to a level at which there is a risk that precipitates of the supplied first and second additive, respectively, arise in the exhaust treatment system.

At least one of the first supply 230 of the first additive and the second supply 270 of the second additive may also be controlled to decrease, for example after such precipitates arise, following which residues and/or precipitates of at least one of the first and the second additives are eliminated by heat in the exhaust stream. According to one embodiment, this decrease consists of an interruption of the supply of the first and/or the second additive. This control, which gives a reduced supply, is carried out if a required/desired/requested total catalytic function in the exhaust treatment system may be provided during and/or after the decrease. This ensures that a required/desired/requested amount/level of nitrogen oxides $NO_x$ is released from the exhaust treatment system. The term catalytic function, as used herein, means a function corresponding to a conversion level of, for example, nitrogen oxides $NO_x$. Said required catalytic function may here depend, for example, on current measured, modelled and/or predicted operating conditions for the combustion engine. Predicted values may, as mentioned above, be determined based on, for example, positioning information, such as GPS-information, and map data.

A required impact/reduction/catalytic function referred to herein may be related to a maximum permitted emission of nitrogen oxides $NO_x$, which may be based, for example, on emission requirements in the emission standard Euro VI or in other existing and/or future emissions standards.

According to different embodiments of the present invention, the control 220 of the first supply 230 of the first additive may also be carried out based on one or several characteristics and/or operating conditions for one or more of the catalytic filter 320 and the reduction catalyst device 330.

Similarly, the control 260 of the second supply 270 of the second additive may be carried out based on one or more characteristics and/or operating conditions for one or more of the reduction catalyst device 330 and the catalytic filter 320.

These characteristics for the catalytic filter and the reduction catalyst device, respectively, may be related to catalytic reduction characteristics for the catalytic filter, catalytic reduction characteristics and oxidation characteristics for the catalytic filter, catalytic characteristics for the reduction catalyst device, a catalyst type for the catalytic filter, a catalyst type for the reduction catalyst device, a temperature interval within which the catalytic filter is active, a temperature interval within which the reduction catalyst device is active, a coverage of ammonia for the catalytic filter and/or a coverage of ammonia for the reduction catalyst device.

The above operating conditions for the catalytic filter and the reduction catalyst device, respectively, may be related to a representation of a temperature for the catalytic filter, a representation of a temperature for the reduction catalyst device, a representation of a temperature trend for the catalytic filter and/or a representation of a temperature trend for the reduction catalyst device. These representations of one or several temperatures may, for example, be based on measured, modelled and/or predicted temperatures in the exhaust treatment system, for example based on measurements provided by one or several temperature sensors described herein, which may be arranged in/at/on, upstream and/or downstream of the catalytic filter and/or the reduction catalyst device.

The function and efficiency for catalysts in general, and for catalysts with reduction characteristics in particular, is dependent, for example, on a ratio between nitrogen dioxide and nitrogen oxides, that is to say the $NO_2/NO_x$-fraction, in the exhausts. The $NO_2/NO_x$-fraction depends, however, on a number of other factors, for example how the driver drives the vehicle and/or on a current driving mode. For example, the $NO_2/NO_x$-fraction in the exhausts may depend on the torque requested by a driver and/or by a cruise control, on the appearance of the road section in which the vehicle is located and/or the driving style of the driver.

A traditional exhaust treatment system generates a substantially constant fraction of nitrogen dioxide $NO_2$ in the nitrogen oxides $NO_x$ for a given exhaust flow and a given temperature. The optimization of these components is difficult, since these parameters will depend on the manner in which the engine is used, and may not be controlled. Reduction catalysts in the exhaust treatment system need, on the one hand, a sufficiently high fraction of nitrogen dioxide $NO_2$ at low exhaust temperatures. On the other hand, their function deteriorates if the fraction of nitrogen dioxide $NO_2$ becomes too high at an optimal temperature for an oxidation catalyst DOC and for a filter in the exhaust treatment system. Exhaust treatment systems of today may therefore suffer from both too large/too high fractions of nitrogen dioxide $NO_2$, and too small/too low fractions of nitrogen dioxide $NO_2$, depending on the current operation and/or hardware specification for the respective component.

High fractions of nitrogen oxides $NO_2$ in the nitrogen oxides $NO_x$ entail that the kinetic activities of the SCR-catalyst are limited. Adaptations of the urea dosage, which occur during a relatively brief time period, in this case also run a risk of not giving correct results, because of a reduced catalytic efficiency of the SCR-catalyst.

In some conditions regarding the catalyst temperature and flow, i.e. for a certain dwell-time in the catalyst ("Space Velocity"), there is a risk that a non-advantageous fraction of nitrogen dioxides $NO_2$ is obtained. Specifically, there is a risk that the ratio $NO_2/NO_x$ exceeds the value 50%, which may constitute a real problem for the exhaust purification. An optimization of the ratio $NO_2/NO_x$ for critical operating modes with low temperatures thus risk, with prior art solutions, giving too high a fraction of nitrogen dioxides $NO_2$ in other operating modes at higher temperatures. This higher fraction of nitrogen dioxides $NO_2$ results in a greater volume requirement for the SCR-catalyst, and/or in a limitation of the amount of nitrogen oxides emitted from the engine, and accordingly a poorer fuel efficiency for the vehicle/engine. Additionally, there is a risk that the higher fraction of nitrogen dioxides $NO_2$ also results in production of laughing gas $N_2O$ in a selective catalytic reduction catalyst, potentially arranged downstream.

These risks of a non-advantageous fraction of nitrogen monoxide $NO_2$ arising also exist due to the system's ageing. For example, the ratio $NO_2/NO_x$ may assume lower values when the system has aged, which may entail that a catalyst specification, which results in too high fractions of $NO_2/NO_x$ in a non-aged state, must be used to compensate for ageing.

A first amount of nitrogen oxides $NO_{x\_1}$ reaching the catalytic filter may, according to one embodiment, correspond to a first ratio $NO_{2\_1}/NO_{x\_1}$ between a first amount of nitrogen dioxide $NO_{2\_1}$ and a first amount of nitrogen oxides $NO_{x\_1}$ reaching the catalytic filter, that is to say, the quota between nitrogen dioxide and nitrogen oxides $NO_{2\_1}/NO_{x\_1}$ upstream of the catalytic filter, leaving the first oxidation catalyst. A value $(NO_{2\_1}/NO_{x\_1})_{det}$ may be determined for this first ratio $NO_{2\_1}/NO_{x\_1}$, for example as a measured, modelled and/or predicted value. A predicted value may, as mentioned above, be determined based on, for example, positioning information, such as GPS-information, and map data.

A second amount of nitrogen oxides $NO_{x\_2}$ reaching the reduction catalyst device may, according to one embodiment, correspond to a second ratio $NO_{2\_2}/NO_{x\_2}$, between a second amount of nitrogen dioxide $NO_{2\_2}$ and a second amount of nitrogen oxides $NO_{x\_2}$ reaching the reduction catalyst device. A value $(NO_{2\_2}/NO_{x\_2})_{det}$ may be determined for the second ratio $NO_{2\_2}/NO_{x\_2}$, for example in the form of a measured, modelled and/or predicted value. A predicted value may, as mentioned above, be determined based on, for example, positioning information, such as GPS-information, and map data.

According to one embodiment of the present invention, the first supply 230 of the first additive is also controlled 220 based on a distribution of the quota between nitrogen dioxide and nitrogen oxides $NO_{2\_1}/NO_{x\_1}$ upstream of the catalytic filter, that is to say, for example, based on a determined value $(NO_{2\_1}/NO_{x\_1})_{det}$ for this first ratio. The first supply 230 of the first additive may here be controlled based on a determined value $(NO_{2\_1}/NO_{x\_1})_{det}$ for the first ratio, so that a fast reduction may be used in the reduction in the catalytic filter. Thus, the first supply 230 may be controlled in such a way that the reduction in the catalytic filter and/or the reduction catalyst device occurs, to as great an extent as possible, via reaction paths over both nitrogen oxides NO, and nitrogen dioxide $NO_2$.

This active control of the first supply 230 may here achieve a reduction of a value $NO_{2\_2}/NO_{x\_2}$ for this second ratio, since the second amount of nitrogen oxides $NO_{x\_2}$ reaching the second device increases. This may be achieved by way of carrying out the active control of the first supply so that the first supply decreases, whereby the first reduction of the first amount of nitrogen oxides $NO_{x\_1}$ in the catalytic filter decreases. Thus, an increase of the second amount of nitrogen oxides $NO_{x\_2}$ is achieved. In other words, the active control means that a high determined value $(NO_{2\_2}/NO_{x\_2})_{det}$ for the second ratio results in supply of less additive than what a low determined value $(NO_{2\_2}/NO_{x\_2})_{det}$ for the second ratio results in.

This may also be described as the first supply 230 of additive decreases, if the determined value $(NO_{2\_2}/NO_{x\_2})_{det}$ for the second ratio is greater than an upper threshold value $(NO_{2\_2}/NO_{x\_2})_{threshold\_high}$, $(NO_{2\_2}/NO_{2\_2}/NO_{x\_2})_{det} > (NO_{2\_2}/NO_{x\_2})_{threshold\_high}$.

This upper threshold value $(NO_{2\_2}/NO_{x\_2})_{threshold\_high}$ may have a value that depends on catalytic characteristics for the catalytic filter SCRF and/or catalytic characteristics for the reduction catalyst device. The upper threshold value $(NO_{2\_2}/NO_{x\_2})_{threshold\_high}$ may also have a value that depends on a catalyst type for the catalytic filter SCRF and/or for the reduction catalyst device. The upper threshold value $(NO_{2\_2}/NO_{x\_2})_{threshold\_high}$ may also have a value that depends on a temperature interval, within which the catalytic filter and/or the reduction catalyst device are active. The upper threshold value $(NO_{2\_2}/NO_{x\_2})_{threshold\_high}$ may also have a value that depends on a coverage level of additive for the catalytic filter and/or the reduction catalyst device. The upper threshold value $(NO_{2\_2}/NO_{x\_2})_{threshold\_high}$ may also have a value that depends on a representation of a temperature at the catalytic filter and/or the reduction catalyst device. These representations of one or several temperatures may, for example be based, on measured, modelled and/or predicted temperatures in the exhaust treatment system, for example based on measurements provided by one or several temperature sensors described herein.

The upper threshold value $(NO_{2\_2}/NO_{x\_2})_{threshold\_high}$ may, for example, have a value within the interval $(NO_{2\_2}/NO_{x\_2})_{threshold\_high} > 50\%$, preferably within the interval $50\% > (NO_{2\_2}/NO_{x\_2})_{threshold\_high} \geq 85\%$, and more preferably within the interval $60\% > (NO_{2\_2}/NO_{x\_2})_{threshold\_high} \geq 75\%$.

According to another embodiment of the present invention, the active control of the first supply 230 achieves an increase of a value $NO_{2\_2}/NO_{x\_2}$ for the second ratio. This increase is achieved through the second amount of nitrogen oxides $NO_{x\_2}$ being reduced. The increase of the value $NO_{2\_2}/NO_{x\_2}$ for the second ratio may here be achieved by way of the active control of the first supply being carried out in such a manner, that the first reduction increases in the catalytic filter. The increased reduction in the catalytic filter results in a reduction of the second amount of nitrogen oxides $NO_{x\_2}$. In other words, the first supply 230 may be based on the determined value $(NO_{2\_2}/NO_{x\_2})_{det}$ for the second ratio, in such a manner that a low determined value $(NO_{2\_2}/NO_{x\_2})_{det}$ thus results in supply of more additive, than what a high determined value $(NO_{2\_2}/NO_{x\_2})_{det}$ results in.

This may also be expressed as the first supply 230 being increased, if the determined value $(NO_{2\_2}/NO_{x\_2})_{det}$ for the second ratio is less than, or equal to, a lower threshold value $(NO_{2\_2}/NO_{x\_2})_{threshold\_low}$, $(NO_{2\_2}/NO_{x\_2})_{det} \leq (NO_{2\_2}/NO_{x\_2})_{low}$. This lower threshold value $(NO_{2\_2}/NO_{x\_2})_{threshold\_low}$ may have a value that depends on catalytic characteristics for the catalytic filter and/or the reduction catalyst device. The lower threshold value $(NO_{2\_2}/NO_{x\_2})_{threshold\_low}$ may also have a value that depends on a catalyst type for the catalytic filter and/or the reduction catalyst device. The lower threshold value $(NO_{2\_2}/NO_{x\_2})_{threshold\_low}$ may also have a value that depends on a representation of a temperature interval, within which the catalytic filter and/or the reduction catalyst device are active. The lower threshold value $(NO_{2\_2}/NO_{x\_2})_{threshold\_low}$ may also have a value that depends on a coverage level of additive for the catalytic filter and/or the reduction catalyst device. The lower threshold value $(NO_{2\_2}/NO_{x\_2})_{threshold\_low}$ may also have a value that depends on a coverage level of additive for the catalytic filter and/or the reduction catalyst device. The lower threshold value $(NO_{2\_2}/NO_{x\_2})_{threshold\_low}$ may also have a value that depends on a representation of a temperature at the catalytic filter and/or the reduction catalyst device. These representations of one or several temperatures may, for example, be based, on measured, modelled and/or predicted temperatures in the exhaust treatment system, for example based on measurements provided by one or several temperature sensors described herein. The lower threshold value $(NO_{2\_2}/NO_{x\_2})_{threshold\_low}$ may, for example, have a value within the interval $(NO_{2\_2}/NO_{x\_2})_{threshold\_low} < 50\%$, preferably within the interval $10\% \leq (NO_{2\_2}/NO_{x\_2})_{threshold\_low} < 40\%$, and more preferably within the interval $20\% \leq (NO_{2\_2}/NO_{x\_2})_{threshold\_low} \leq 60\%$.

According to one embodiment of the present invention, an adjustment is carried out, when needed, of the first ratio $NO_{2\_1}/NO_{x\_1}$ between the first amount of nitrogen dioxide $NO_{2\_1}$ and the first amount of nitrogen oxides $NO_{x\_1}$ leaving the first oxidation catalyst and thus reaching the catalytic filter, since an active control of this first amount of nitrogen oxides $NO_{x\_1}$ is carried out with engine and/or combustion measures. Accordingly, the first amount of nitrogen oxides $NO_{x\_1}$ is here impacted by an active control of the combustion engine, in order to give a first ratio $NO_{2\_1}/NO_{x\_1}$ a suitable value, for example, based on a determined value $(NO_{2\_1}/NO_{x\_1})_{det}$ for this first ratio. The combustion engine may thus be controlled to alter its emitted amount of nitrogen oxides $NO_x$, if the determined value $(NO_{2\_1}/NO_{x\_1})_{det}$ for the ratio is not optimal. The value that is considered to be optimal depends on the objective of the active control of the combustion parameters. Such an objective may be to achieve an effective soot oxidation in the catalytic filter. Another objective may be to achieve an effective reduction of nitrogen oxides in the catalytic filter.

Access to nitrogen dioxide $NO_{2\_1}$ in the exhaust stream at the catalytic filter is important for the nitrogen dioxide-based soot oxidation in the filter, and for the reduction of nitrogen oxides $NO_{x\_1}$ in the filter. The exhaust treatment system according to the embodiment may therefore provide a good soot oxidation in the catalytic filter, thanks to the access to nitrogen dioxide $NO_{2\_1}$ after the first oxidation catalyst. Additionally, the reaction speed of the first reduction in the catalytic filter may be impacted by the ratio between nitrogen monoxide $NO_1$ and nitrogen dioxide $NO_{2\_1}$ in the exhaust stream reaching the catalytic filter. A more efficient first reduction in the catalytic filter may here be obtained thanks to the previous oxidation of nitrogen oxides $NO_1$ to nitrogen dioxides $NO_{2\_1}$ in the first oxidation catalyst, in combination with the active control of the at least one parameter related to the combustion engine.

Through the use of this embodiment of the present invention, the fraction of nitrogen oxides $NO_x$ consisting of nitrogen dioxide $NO_2$ may thus be actively controlled, which is facilitated by an active control of the amount of nitrogen oxides $NO_x$ upstream of at least one substrate with oxidizing coating, for example comprising precious metals, in the exhaust treatment system. This control of the ratio $NO_2/NO_x$ may, apart from advantages in catalytic performance, such as higher $NO_x$-conversion, also result in a possibility of specifically reducing emissions of nitrogen dioxide $NO_2$, which result in a very poisonous and strong smelling emission. This may result in advantages at a potential future introduction of a separate legal requirement relating to nitrogen dioxide $NO_2$, through a possibility of reducing emissions of nitrogen dioxide $NO_2$. This may be compared with for example the Euro VI-system, in which the fraction of nitrogen dioxide $NO_2$ provided at exhaust purification may not be directly impacted in the exhaust treatment system itself, since the fraction of nitrogen dioxide $NO_2$ in the Euro VI-system is due to usage/operation, and may not be controlled in any other way.

In other words, the active control of the level of nitrogen dioxide $NO_2$ is facilitated by the present invention, which is used to increase or reduce the level of nitrogen dioxide $NO_2$ in the driving modes for which this is necessary. Thus, an exhaust treatment system may be created, which requires less precious metal and accordingly also is cheaper to manufacture.

Through the use of the control according to one embodiment of the present invention, a fuel consumption neutral manner of increasing the reaction speed over one or several selective catalytic reduction catalyst in the exhaust treatment system is obtained, since the control may be carried out in such a way, that as large a fraction as possible of the reduction occurs via reaction paths over both nitrogen oxide $NO$ and nitrogen dioxide $NO_2$. Thus, through the control according to the embodiment, the fraction of the total conversion of nitrogen oxides $NO_x$ occurring via a fast reaction path, that is to say via a "fast SCR", may be increased through active control of the level of nitrogen dioxide $NO_2$. Accordingly, the volume requirements relating to the catalyst may also be reduced. Fast SCR is described in further detail below.

The ratio $NO_2/NO_x$ may, due to ageing, assume lower values, for example after the exhaust treatment system has been in operation for some time. There is accordingly a risk that a non-advantageous fraction of nitrogen dioxide $NO_2$ in the nitrogen oxides $NO_x$ may arise, because of ageing/degrading of the exhaust treatment system. For example, the ratio $NO_2/NO_x$ may assume lower values when the exhaust treatment system has aged, which may entail that a catalyst specification which, in a non-aged/new state, results in too high fractions of $NO_2/NO_x$, must be used to compensate for ageing/degradation.

The embodiment provides for a possibility of preventing this characteristic which has deteriorated over time, and is negative for the exhaust treatment system, by preventing excessively low values for the ratio $NO_2/NO_x$ with the active control according to the invention. Since it is possible, when the present invention is used, to handle higher initial values for the ratio $NO_2/NO_x$, there are better conditions for optimizing performance for both new and aged exhaust treatment systems.

The embodiment uses the fact that the catalytic activity obtained at a given temperature may be impacted, if the composition of the exhausts changes. By adjusting the fraction of nitrogen oxides $NO_x$ that constitute nitrogen dioxides $NO_2$, an impact of the reactions that are the basis of the reduction may be achieved. In other words, the reduction catalyst's activity may be impacted by an adjustment of the fraction of nitrogen oxides $NO_x$ consisting of nitrogen dioxide $NO_2$. A fraction of the nitrogen oxides $NO_x$, consisting of nitrogen dioxide $NO_2$ representing 50%, results, according to different embodiments of the present invention, in the fastest kinetics and/or the best catalytic performance, and therefore results in the smallest requirements relating to substrate volumes for the catalytic filter. Additionally, a control according to the embodiment, towards a suitable value for the fraction of the nitrogen oxides $NO_x$ consisting of nitrogen dioxides $NO_2$, means that the requirements regarding a potential slip-catalyst SC, arranged downstream in the exhaust treatment system, are lower.

By actively controlling the level of nitrogen oxides $NO_x$ reaching the one or several substrates with an oxidizing coating in the exhaust treatment system, which may for example be comprised in an oxidation catalyst $DOC_1$, $DOC_2$ and/or in a catalytic coating that also has oxidizing characteristics in the catalytic filter SCRF, an adjustment of the fraction of nitrogen dioxide $NO_2$ reaching a catalytic filter 320 arranged downstream of the oxidizing coating, and/or a reduction catalyst device 330 arranged downstream of the oxidizing coating, may, for example, be obtained. This means, for example, that the reduction catalyst provides a turnover which is more predictable. This concerns, for example, an increase of the amount of nitrogen oxides $NO_x$ produced by the engine, in cases where there is a risk that the nitrogen dioxide $NO_2$ fraction of the nitrogen oxides $NO_x$ may exceed a maximum desired value (an upper threshold value).

By using the present invention, a more efficient and predictable reduction of nitrogen oxides $NO_x$ is obtained. As a result, for example, adaptations of urea dosage give more reliable results.

The active control according to the embodiment has potential to facilitate that the exhaust treatment system may fulfil emission requirements in the Euro VI emission standard. Additionally, the control according to the present invention has potential to facilitate that the exhaust treatment system is able to meet the emission requirements in several other existing, and/or future emission standards.

This means that the embodiment may provide the required/desired/requested impact, such as, for example, required reduction of nitrogen oxides $NO_x$ in the exhaust stream, under a large number of different conditions. Accordingly, legal requirements and/or standards for emissions of nitrogen oxides $NO_x$ from the exhaust treatment system may be fulfilled in many more conditions and/or driving modes, than when prior art systems are used.

With the use of the embodiment, a better fuel optimization may be obtained for the vehicle, since there is thus potential to control the engine in a more fuel efficient manner, so that a higher efficiency for the engine is obtained. Thus, a performance gain and/or a reduced emission of carbon dioxide $CO_2$ may be obtained when the present invention is used.

According to one embodiment of the present invention, when needed, an adjustment of a second ratio $NO_{2\_2}/NO_{x\_2}$ is carried out between a second amount of nitrogen dioxide $NO_{2\_2}$ and a second amount of nitrogen oxides $NO_{x\_2}$ reaching the reduction catalyst device 330. The adjustment is in this case achieved by an active control of the first reduction 240 of the first amount of nitrogen oxides $NO_{x\_1}$ being carried out, based on a determined value $(NO_{2\_2}/NO_{x\_2})_{det}$ for the second ratio $NO_{2\_2}/NO_{x\_2}$. For example, this active control of the first reduction 240 may be achieved by way of active control 220 of the first supply 230 of the first additive. Thus, the first supply 230 may be controlled in such a way that the reduction 280 in the reduction catalyst device occurs, to as great an extent as possible, via reaction paths over both nitrogen oxides NO, and nitrogen dioxide $NO_2$. In fast reduction, the reaction uses equal parts of nitrogen monoxide NO and nitrogen dioxide $NO_2$, which means that an optimal value for the molar ratio $NO_2/NO_x$ is nearly 50%.

For SCR-catalysts, and thus also for catalytic filters with reduction characteristics, mainly three types of reaction paths are defined.

One of these reaction paths is often referred to as "Standard-SCR". Here, nitrogen oxides $NO_x$ consist mainly of nitrogen monoxide NO, so that the reaction path may be written as:

$$4NH_3+4NO+O_2 \leftrightarrow 4N_2+6H_2O \quad (i)$$

Another of these reaction paths corresponds to rapid kinetics, and is often referred to as "Fast SCR"/"fast reduction". Here, both nitrogen monoxide NO and nitrogen dioxide $NO_2$ are available in equal fractions in the nitrogen oxides $NO_x$, so that the reaction path may be written as:

$$4NH_3+2NO+2NO_2 \leftrightarrow 2N_2+3H_2O \quad (ii)$$

Another of these reaction paths corresponds to slow kinetics, and is often referred to as "Slow SCR"/"slow reduction". Here, only nitrogen dioxide $NO_2$ is available for the reaction, since all nitrogen monoxide has been reduced away, and the reaction path may be written as:

$$6NO_2+8NH_3 \leftrightarrow 7N_2+12H_2O \quad (iii)$$

At the slower kinetics in (iii) above, there is also a risk that laughing gas $N_2O$ may be produced, according to the following reaction paths:

$$8NO_2+6NH_3 \rightarrow 7N_2O+9H_2O \quad (iv)$$

$$4NO_2+4NH_3+O_2 \rightarrow 4N_2O+6H_2O \quad (v)$$

The reaction speed for the reduction is (as the names suggest) closely connected to the paths of the reactions. The global reduction will always be a combination of these reaction paths, and probably also of several additional reactions. Thus, the reactions in the SCR-catalyst occur via the above specified reaction paths, which have different speeds.

The present invention uses the discovery that, in modern diesel engines, additional possibilities are opened up for control of the fraction of nitrogen dioxide $NO_2$ in nitrogen oxides $NO_x$ emitted from the engine. The present invention here uses the possibility of controlling the engine's level of nitrogen oxides $NO_x$. This is possible since the fraction of nitrogen dioxide $NO_2$ in the nitrogen oxides $NO_x$ depends on the level of nitrogen oxides $NO_x$.

For exhaust treatment systems with a component coated with precious metal, such as the oxidation catalyst DOC, arranged upstream of the catalytic filter SCRF, the first ratio $NO_{2\_1}/NO_{x\_1}$ reaching the catalytic filter SCRF, or other components arranged downstream, may be controlled.

To compensate for the limited availability of heat at, for example, cold starts and operation with low load, it is desirable to use a so-called fast reduction/SCR ("Fast SCR"). At a fast reduction/SCR, the reduction is controlled to occur, to as great an extent as possible, via reaction paths over both nitrogen oxide NO and nitrogen dioxide $NO_2$. Thus, at fast reduction/SCR the reaction uses equal parts of nitrogen oxide NO and nitrogen dioxide $NO_2$, which means that an optimal value for the molar ratio $NO_2/NO_x$ may for example be close to 50%. With the use of embodiments of the present invention, the molar ration $NO_2/NO_x$ may be controlled to be nearer this optimal value, while the soot build-up in the catalytic filter may be kept under control over time, since soot oxidation is prioritized during a relatively large part of the operation.

As mentioned above, the catalytic filter SCRF uses additive at the reduction of nitrogen oxides $NO_{x\_1}$ in the exhausts. Additive is injected into the exhaust stream resulting from the combustion engine, upstream of the catalyst, and is adsorbed (deposited) in the catalytic coating with reduction characteristics, so that a redox-reaction may occur between nitrogen oxides $NO_{x\_1}$ in the exhausts and the additive.

The active control of the first supply 230 of the first additive may, for example, be based also on a coverage degree/filling degree of additive for the catalytic filter.

The active control of the first supply 230 of the first additive may, for example, be based at least on one catalytic characteristic for the catalytic filter SCRF.

The active control of the first supply 230 of the first additive may, for example, also be based on a representation of a temperature for the catalytic filter and/or for the reduction catalyst device. These representations of one or several temperatures may be based, for example, on measured, modelled and/or predicted temperatures in the exhaust treatment system, for example based on measurements provided by one or several temperature sensors described herein.

A person skilled in the art will realize that a method for treatment of an exhaust stream according to the present invention may also be implemented in a computer program, which when executed in a computer will cause the computer to execute the method. The computer program usually consists of a part of a computer program product 403, wherein the computer program product comprises a suitable non-volatile/permanent/persistent/durable digital storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
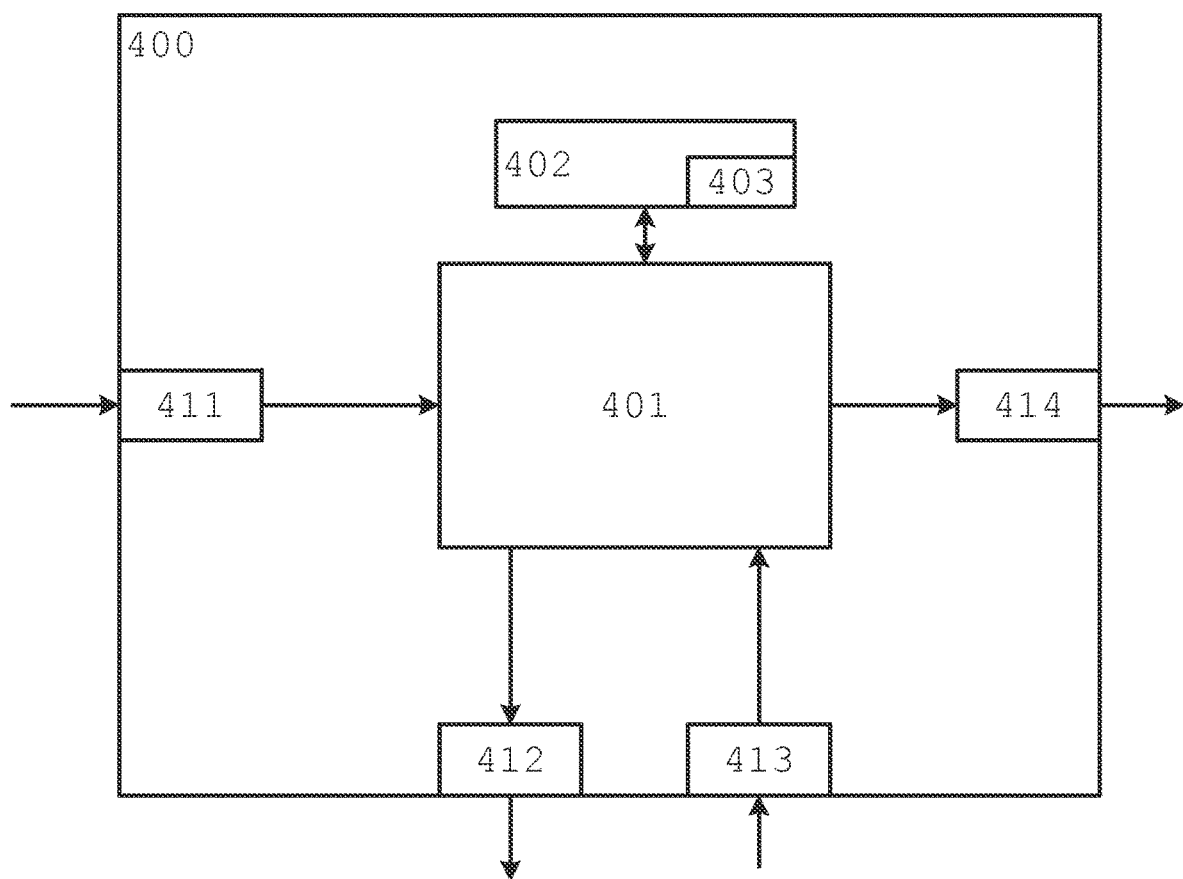
FIG. 4 shows a control device, in which a method according to the present invention may be implemented.

FIG. 4 schematically shows a control device 400. The control device 400 comprises a calculation device 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code, and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals, respectively. These input and output signals may contain wave shapes, pulses or other attributes, which may be detected as information by the devices 411, 413 for the receipt of input signals, and may be converted into signals that may be processed by the calculation device 401. These signals are then provided to the calculation device 401. The devices 412, 414 for sending output signals are arranged to convert the calculation result from the calculation unit 401 into output signals for transfer to other parts of the vehicle's control system, and/or the component(s) for which the signals are intended, for example the first and/or second dosage devices.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than shown in FIGS. 1, 3 and 4, as is well known to a person skilled in the art within the technology area.

The present invention, in the embodiment displayed, is implemented in the control device 400. The invention may, however, also be implemented wholly or partly in one or several other control devices, already existing in the vehicle, or in a control device dedicated to the present invention.

Here, and in this document, control devices are often described as being arranged to carry out steps in the method according to the invention. This also comprises that the devices are adapted and/or set up to carry out these method steps. For example, these control devices may correspond to different groups of instructions, for example in the form of program code, which is fed into, and used by a processor, when the respective control device is active/used to implement the respective method steps.

Figure 3:
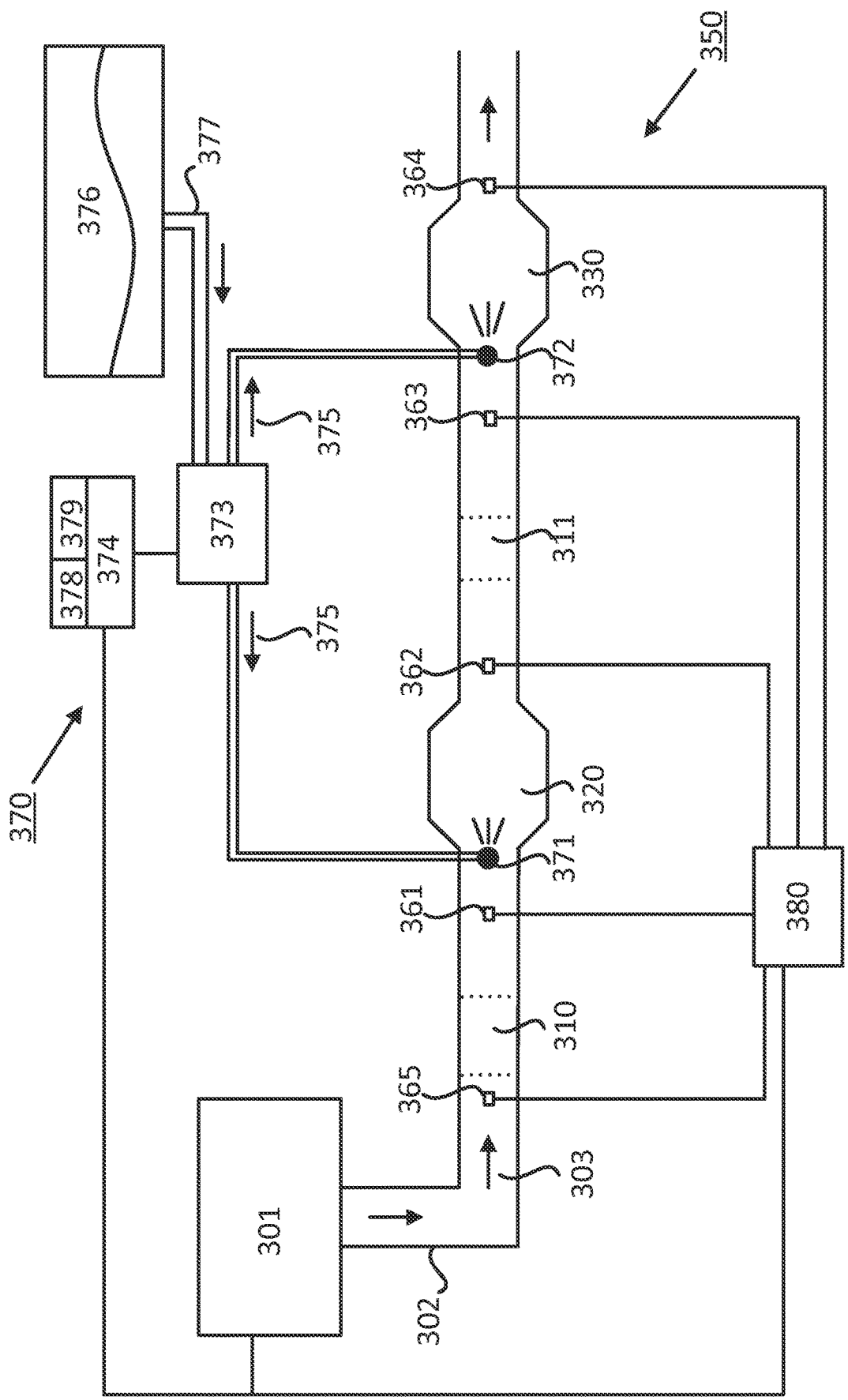
FIG. 3 shows an example of an exhaust treatment system according to one embodiment of the present invention.

FIG. 3 schematically shows an exhaust treatment system 350 according to one aspect of the present invention, which system is connected to a combustion engine 301 via an exhaust conduit 302. Exhausts generated at combustion in the engine 301 and the exhaust stream 303 (indicated with arrows) are led to a first oxidation catalyst 310, which is arranged for oxidation 210 of compounds comprising one or more of nitrogen, carbon and hydrogen in the exhaust stream 303.

The exhaust stream 303 is led past a first dosage device 371, arranged in the exhaust treatment system 350 to provide a first supply 230 of a first additive into the exhaust stream 303, before it reaches the catalytic filter 320. The first additive supplied to the exhaust stream 303 at the first supply 230 is used at a first reduction of a first amount of nitrogen oxides $NO_{x\_1}$ via the catalytic filter 320.

According to one embodiment of the invention, a first hydrolysis catalyst, which may consist of substantially any suitable hydrolysis coating, and/or a first mixer, may be arranged in connection with the first dosage device 371. The first hydrolysis catalyst, and/or the first mixer, are then used to increase the speed of the decomposition of urea into ammonia, and/or to mix the additive with the emissions, and/or to vaporize the additive.

The catalytic filter 320 is arranged downstream of the first dosage device 371, and consists of a particulate filter with an at least partly catalytic coating with reduction characteristics, which is arranged for catching and oxidizing of soot particles 250, and to carry out a first reduction 240 of a first amount of nitrogen oxides $NO_{x\_1}$ reaching the catalytic filter 320. The catalytic reaction in the catalytic filter 320 uses the first additive.

The exhaust treatment system 350 according to the present invention also comprises a control device 380 arranged to determine, or obtain, information related to operating conditions for the combustion engine, for the exhaust treatment system and/or for the vehicle, and to provide an active control 220 of the first dosage device 371, which is arranged downstream of the first oxidation catalyst 310 and upstream of the catalytic filter 320, in order to carry out a first supply 230 of a first additive into the exhaust stream 303. As described above, the control device 380 is arranged to control 220 the supply 230 of the first additive, in such a manner that an accumulation of soot exceeding a soot threshold value $S_{th}$ in the catalytic filter 320 is avoided. This soot threshold value $S_{th}$ depends at least on determined operating conditions for the combustion engine 301, which impact a level of a flow for the exhaust stream 303, as described above.

According to one embodiment of the present invention, the control device 380 is arranged to determine the soot threshold value $S_{th}$ based on these one or more operating conditions, in such a manner that the soot threshold value $S_{th}$ is allocated a smaller value for one or more operating conditions resulting in a higher level of the flow and a greater value for one or several operating conditions resulting in a lower level of the flow.

The exhaust treatment system 350 also comprises a second dosage device 372, arranged downstream of the catalytic filter 320 and upstream of a reduction catalyst device 330, in order to provide a second supply 270 of a second additive to the exhaust stream 303, according to a control 260 of this supply 270. For this embodiment, the second additive is used, which is supplied to the exhaust stream by the second dosage device 372 during the second reduction 280 in the reduction catalyst device 330.

According to one embodiment of the present invention, the control device 380 is arranged to control 220 the first supply 230 of the first additive, based at least on the soot threshold value $S_{th}$, so that nitrogen dioxide $NO_2$ is available in the catalytic filter, except for time-limited special operating conditions for the combustion engine, whereby a required soot oxidation over time may be provided.

At normal operation of the vehicle/combustion engine it will be possible to give the oxidation of soot particles in the filter a higher priority than the first reduction 240 of nitrogen oxides $NO_x$ when the exhaust treatment system according to the present invention is used, since there is an additional possibility of reduction of nitrogen oxides $NO_x$ in the system, in the form of the reduction catalyst device 330 downstream of the catalytic filter 320. Thus, the catalytic filter does not always have to prioritize the first reduction 240 of nitrogen oxides $NO_x$, since nitrogen oxides $NO_x$ passing through the catalytic filter 320 may be reduced in the reduction catalyst device 330 arranged downstream. This configuration of the exhaust treatment system according to the present invention thus provides the catalytic filter with extra degrees of freedom for the first reduction 240 of nitrogen oxides $NO_x$, which are used to achieve an improved soot oxidation in the filter over time.

The time-limited special operating conditions are, according to one embodiment of the present invention, so limited in time that accumulation of soot exceeding a soot threshold value $S_{th}$ over time may be avoided. This is possible since nitrogen dioxide $NO_2$, which may be used to facilitate oxidation of soot particles in the filter, is available in said catalytic filter substantially always, except when these time-limited special operating conditions prevail. In other words, an uncontrolled accumulation of soot in the filter may thus be avoided, since an effective $NO_2$-based soot oxidation may, as a rule, be provided, wherein this effective $NO_2$-based soot oxidation is only interrupted by briefer periods with poorer availability of nitrogen dioxide $NO_2$ in the filter.

According to one embodiment of the present invention, the soot threshold value $S_{th}$ is given a size entailing that the control 220 of the first supply 230 of the first additive results in nitrogen dioxide $NO_2$, which may be used to facilitate oxidation of soot particles in the catalytic filter, substantially always is available in the catalytic filter. This ensures a good soot oxidation in the filter.

The exhaust treatment system 350 also comprises, according to one embodiment, at least one dosage control device 374, arranged to control at least one of the first supply 230 and the second supply 270.

In other words, the dosage control device 374 controls one or several of the first dosage device 371 and the second dosage device 372, and/or pumps or similar devices, which supply these dosage devices 371, 372 with additive. According to one embodiment, this dosage is controlled in such a way that a sufficient amount of additive is supplied into the exhaust stream via the first dosage device 371, in order to achieve the active control of the first reduction 240 in the catalytic filter 320.

Through the use of the exhaust treatment system 350 according to the present invention, the active control of the level of nitrogen dioxide $NO_2$ may be used to increase or reduce the level of nitrogen dioxide $NO_2$ in those driving modes, for which this is necessary. Thus, an exhaust treatment system may be created, which requires less precious metal and accordingly also is cheaper to manufacture.

With the use of the control according to the present invention, a fuel consumption neutral manner of increasing the reaction speed of reductions in the exhaust treatment system is obtained, since the control may be implemented in such a manner, that as large a fraction as possible of the reduction occurs via reaction paths over both nitrogen oxide NO and nitrogen dioxide $NO_2$.

According to one embodiment of the present invention, the at least partly catalytic coating, which is comprised in the catalytic filter, may have both reduction characteristics and oxidation characteristics.

According to another embodiment of the present invention, the exhaust treatment system may comprise a second oxidation catalyst 311, arranged downstream the catalytic filter 320 and upstream of the second dosage device 372, in order to carry out a second oxidation of compounds comprising one or more of nitrogen, carbon and hydrogen in said exhaust stream 303.

The first oxidation catalyst $DOC_1$ 310 and/or the second oxidation catalyst $DOC_2$ 311 is at least partially coated with a catalytically oxidizing coating, wherein this oxidizing coating may comprise at least one precious metal, for example platinum.

Figure 5:
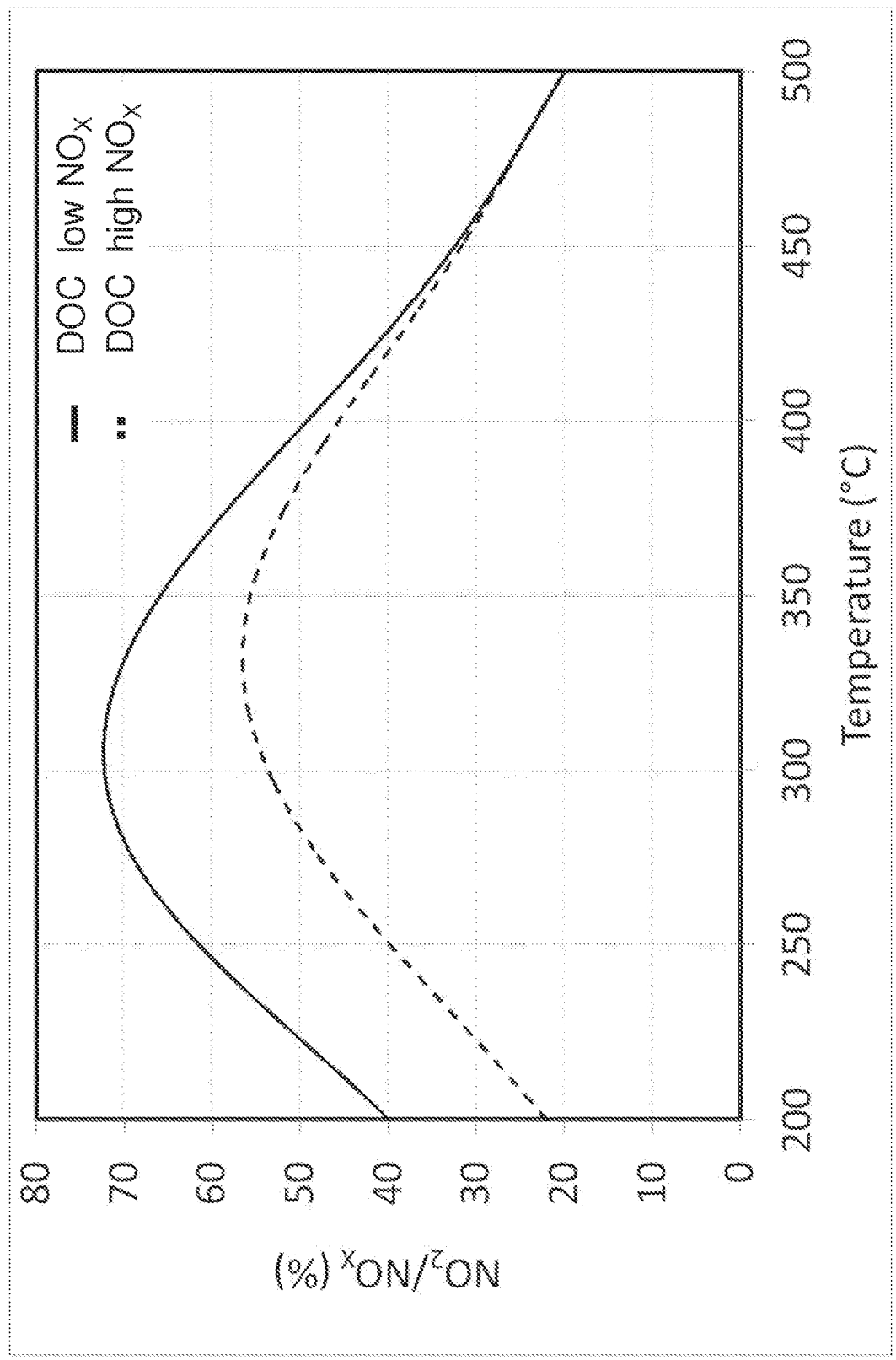
FIG. 5 shows an example of an effect of an increased $NO_x$-level.

By actively controlling the level of nitrogen oxides $NO_x$ reaching the at least one substrate with oxidizing coating, which may, for example, be comprised in a first oxidation catalyst $DOC_1$ 310, in a second oxidation catalyst $DOC_2$ 311, and/or in the catalytic filter SCRF 320, an adjustment of the fraction of nitrogen dioxide $NO_2$ reaching a reduction catalyst device 330, arranged downstream, may be obtained. This means that the reduction catalyst device 330 provides a turnover that is more predictable. For example, an increase of the amount of nitrogen oxides $NO_x$ produced by the engine may be desirable in those cases, where it is expected that there is a risk of the fraction of nitrogen dioxides $NO_2$ exceeding a maximum desired value. As an example, FIG. 5 shows an effect obtained for the fraction of nitrogen dioxide $NO_2$ at an increase of the level of nitrogen oxides NO from a low value, for example 300 ppm, to a higher value, for example 1400 ppm. As described by the figure, the value for the ratio $NO_2/NO_x$ at DOC, drops from approximately 70% to between 50% and 60%, when the level for nitrogen oxides $NO_x$ increases from 300 to 1400 ppm. This reduction of the value for the ratio $NO_2/NO_x$ considerably improves the conditions for "fast SCR" as described above.

The load on the catalytic filter 320 and/or the reduction catalyst device 330 increases as a result of the increased level of nitrogen oxides $NO_x$. Since the increase occurs primarily at an approximate exhaust temperature of around 260-340° C., at which there is a risk of the at least one oxidizing substrate producing $NO_2/NO_x > 50\%$, the catalytic filter 320 and/or the reduction catalyst device 330 will have good conditions for coping with this load. At these temperatures, that is to say at 260-340° C., the catalytic filter 320 and/or the reduction catalyst device 330, depending on the respective specifications, have rather a good performance. Additionally, there are rather good conditions for vaporization of reductant at these temperatures.

According to one embodiment of the present invention, the first, and/or the second additive, comprises ammonia $NH_3$ or urea, from which ammonia may be generated/formed/released. This additive may for example consist of AdBlue. The first and the second additive may be of the same type, or may be of different types.

According to one embodiment of the present invention, the exhaust treatment system 350 comprises a system 370 for supply of additive, which comprises at least one pump 373 arranged to supply the first 371 and the second 372 dosage devices with additive, that is to say for example ammonia or urea.

One example of such a system 370 for supply of additive is displayed schematically in FIG. 3, where the system comprises the first dosage device 371 and the second dosage device 372, which are arranged upstream of the catalytic filter 320, and upstream of the reduction catalyst device 330, respectively. The first and second dosage devices 371, 372, often consisting of dosage nozzles administering additive to, and mixing such additive with the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized that the additive may be in liquid form and/or gaseous form. Where the additive is in liquid form, the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 180° C. According to one embodiment of the invention, the system 370 for supply of additive comprises a dosage control device 374, arranged to control the at least one pump 373, in such a manner that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, in such a manner that a second dosage of the second additive is supplied to the exhaust stream 303, via the second dosage device 372.

The first and second additives usually consist of the same type of additive, for example urea. However, according to one embodiment of the present invention, the first additive and the second additive may be of different types, for example urea and ammonia, which means that the dosage to each one of the first 331 and second 332 devices, and accordingly also the function for each of the first 331 and second 332 devices, may be optimized also with respect to the type of additive. If different types of additive are used, the tank 376 comprises several sub-tanks, which contain the different respective types of additive. One or several pumps 373 may be used to supply the different types of additive to the first dosage device 371 and the second dosage device 372. As mentioned above, the one or several tanks, and the one or several pumps, are adapted according to the state of the additive, that is to say according to whether the additive is gaseous or liquid.

The one or several pumps 373 are thus controlled by a dosage control device 374, which generates control signals for the control of supply of additive, so that a desired amount is injected into the exhaust stream 303 with the help of the first 371 and the second 372 dosage device, respectively, upstream of the catalytic filter 320 and the reduction catalyst device 330, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

The at least one control device 374 is drawn in the figure as comprising separately marked units 378, 379. These units 378, 379 may be logically separate, but physically implemented in the same unit, or they may be both logically and physically jointly arranged/implemented. For example, these units 378, 379 may correspond to different groups of instructions, for example in the form of program code, which is fed into, and used by a processor, when the respective unit is active/used to implement the respective method steps.

The exhaust treatment system 350 may also equipped with one or several sensors, such as one or several $NO_x$—, $NO_2$— and/or temperature sensors 361, 362, 363, 364, 365, arranged, for example, upstream of a potential oxidation catalyst 310 arranged upstream of the catalytic filter, at the inlet to the catalytic filter 320, at the outlet from the catalytic filter 320, at the inlet to the reduction catalyst device 330 and/or at the outlet from the reduction catalyst device 330, for determination of nitrogen oxides, nitrogen dioxide and/or temperatures in the exhaust treatment system. The temperature sensors 361, 362, 363, 364, 365 may be arranged upstream and/or downstream of one or more of the components 310, 311, 320, 330 in the exhaust treatment system 350. Temperature sensors may also be arranged in/at/on one or more of the components 310, 311, 320, 330 in the exhaust treatment system 350.

The control device 380 may be arranged to provide control signals, and/or signals corresponding to measurements carried out by the one or several $NO_x$—, $NO_2$— and/or the temperature sensors 361, 362, 363, 364, 365, to at least one dosage control device 374. The at least one dosage control device 374 thereafter bases the control of supplying dosage substance on such control signals, and/or measurement signals, so that the above mentioned active control of the first impact is obtained.

The control device 380 may also be arranged to provide control signals, and/or signals corresponding to measurements carried out by the one or several $NO_x$—, $NO_2$— and/or the temperature sensors 361, 362, 363, 364, 365 to the combustion engine 301 and/or an engine control device. The combustion engine 301, and/or the engine control device, may thereafter base the control of the engine on these control signals, and/or measurement signals, so that the above mentioned active control of the first impact is obtained through a control of the temperature, and/or the exhaust environment.

The method according to the present invention may be implemented in substantially all exhaust treatment systems comprising the catalytic filter 320 described above, the reduction catalyst device 330 described above, and the active control administration/supply of additive 370. Each of the catalytic filter 320 and the reduction catalyst device 330 may be arranged in a number of ways and have a number of different characteristics/functions.

According to different embodiments of the present invention, the reduction catalyst device 330 comprises one from the group of:

a selective catalytic reduction catalyst SCR;

a selective catalytic reduction catalyst SCR followed downstream by a slip-catalyst SC, wherein the slip-catalyst SC is arranged to oxidize a residue of additive, and/or to assist the selective catalytic reduction catalyst SCR with an additional reduction of nitrogen oxides $NO_x$ in the exhaust stream 303; and a slip-catalyst SC, which is arranged primarily for reduction of nitrogen oxides $NO_x$ and secondarily for oxidation of additive in said exhaust stream (303).

In this document, a selective catalytic reduction catalyst SCR means a traditional SCR-catalyst (Selective Catalytic Reduction). SCR catalysts usually use an additive, often ammonia $NH_3$, or a composition from which ammonia may be generated/formed, which is used for the reduction of nitrogen oxides $NO_x$ in the exhausts. The additive is injected into the exhaust stream resulting from the combustion engine, upstream of the catalyst as described above. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

Slip-catalyst SC, as used in this document, means a catalyst which is arranged to oxidize additive, and/or to assist a selective catalytic reduction catalyst SCR with a reduction of nitrogen oxides $NO_x$ in said exhaust stream 303.

A slip-catalyst SC is thus a catalyst, which is arranged to oxidize additive in the exhaust stream, and which is arranged to be able to reduce residues of nitrogen oxides $NO_x$ in the exhaust stream. In more detail, such a slip-catalyst SC may be arranged primarily to reduce nitrogen oxides $NO_x$, and secondarily to oxidize additive. In other words, the slip-catalyst SC may take care of slip-residues of both additive and nitrogen oxides $NO_x$. This may also be described as the slip-catalyst SC being an extended ammoniac slip catalyst ASC, which is also set up for reduction of nitrogen oxides $NO_x$ in the exhaust stream, so that a general multifunctional slip-catalyst SC is obtained, taking care of several types of slip, meaning it takes care of both additive and nitrogen oxides $NO_x$. According to one embodiment of the present invention, at least the following reactions may for example be carried out in a multifunctional slip-catalyst SC, which both reduces nitrogen oxides $NO_x$ and oxidizes additive:

$$NH_3 + O_2 \rightarrow N_2; \quad \text{(vi)}$$

and $$NO_x + NH_3 \rightarrow N_2 + H_2O. \quad \text{(vii)}$$

Here, the reaction according to the equation vi provides an oxidation of the additive, for example residues of additive, which may comprise ammonia. The reaction according to the equation vii results in a reduction of nitrogen oxides $NO_x$.

Accordingly, residues of the additive, as well as residues of ammonia $NH_3$, isocyanic acid HNCO, urea or similar may be oxidized. These residues of additive, that is to say ammonia $NH_3$, HNCO, urea or similar, may here also be used to oxidize nitrogen oxides $NO_x$.

In order to obtain these characteristics, that is to say to obtain a multifunctional slip-catalyst, the slip-catalyst may, according to one embodiment, comprise one or several substances comprised in platinum metals (PGM; Platinum Group Metals), that is to say one or several of iridium, osmium, palladium, platinum, rhodium and ruthenium. The slip-catalyst may also comprise one or several other substances, which give the slip-catalyst similar characteristics as platinum group metals. The slip-catalyst may also comprise an $NO_x$-reducing coating, where the coating may for example comprise Cu- or Fe-zeolite or vanadium. Zeolite may here be activated with an active metal, such as for example copper (Cu) or iron (Fe).

According to one embodiment of the present invention, the at least partly catalytic coating with reduction characteristics in the catalytic filter 320 is arranged in connection with an inlet of the catalytic filter 320. The catalytic coating here at least has reduction characteristics corresponding to reduction characteristics in a selective catalytic reduction catalyst.

According to another embodiment of the present invention, the at least partly catalytic coating with reduction characteristics is instead arranged in connection with an outlet of the catalytic filter 320. The catalytic coating also here at least has reduction characteristics corresponding to reduction characteristics in a selective catalytic reduction catalyst.

According to another embodiment of the present invention, the at least partly catalytic coating is arranged substantially over the entire length of the catalytic filter 320, for example, substantially homogeneously over the entire length, and has reduction characteristics corresponding to reduction characteristics in a selective catalytic reduction catalyst SCR. In other words, the exhaust stream 303, which passes through the catalytic filter, reaches the at least partly catalytic coating substantially in parallel with, that is to say at the same time as, soot particles being caught and oxidized in the filter.

As is obvious to a person skilled in the art, the order of steps 240 and 250 in the methods according to the different embodiments of the present invention, depend on where in the filter the at least partly catalytic coating is arranged.

According to one embodiment of the present invention, the at least partly catalytic coating that is comprised in the catalytic filter also has oxidation characteristics. In other words, the catalytic filter 320 according to this embodiment has both reduction characteristics and oxidation characteristics.

According to one embodiment of the present invention, a slip-catalyst SC is arranged in connection with an outlet in the catalytic filter 320. This slip-catalyst SC is in this case arranged to oxidize a residue of additive and/or to assist the at least partly catalytic coating in the filter with an additional reduction of nitrogen oxides $NO_x$.

The system according to the present invention may be arranged to perform all of the method embodiments described above and in the claims, so that the system for the respective embodiments obtains the above described advantages for the respective embodiments.

A person skilled in the art will also realize that the above system may be modified according to the different embodiments of the method according to the invention. In addition, the invention relates to a motor vehicle 100, for example a truck or a bus, comprising at least one system for treatment of an exhaust stream.

The present invention is not limited to the embodiments of the invention described above, but relates to and comprises all embodiments within the scope of the enclosed independent claims.

The invention claimed is:

1. A method for treatment of an exhaust stream from a combustion in a combustion engine in an exhaust treatment system, said method comprising:
    a first oxidation of compounds comprising one or more of nitrogen, carbon and hydrogen in said exhaust stream using a first oxidation catalyst;
    a regulation of a first supply of a first additive into said exhaust stream using a first dosage device in the exhaust treatment system, arranged downstream of said first oxidation catalyst, wherein application of said first supply is regulated to thereby prevent an accumulation of soot that exceeds a soot threshold value $S_{th}$ in a catalytic filter, arranged downstream of said first dosage device, wherein said soot threshold value $S_{th}$ is determined based on at least one or more operating conditions for said combustion engine, impacting a level of a flow for said exhaust stream;

a first reduction of nitrogen oxides $NO_x$ in said exhaust stream using reduction characteristics in an at least partly catalytic coating comprised in said catalytic filter, and using said first additive;

a catching and oxidizing of soot particles in said exhaust stream using said catalytic filter;

a regulation of a second supply of a second additive into said exhaust stream using a second dosage device, arranged downstream of said catalytic filter; and a second reduction of nitrogen oxides $NO_x$ in said exhaust stream, using at least one of said first and said second additive in a reduction catalyst device, arranged downstream of said second dosage device.

2. The method according to claim 1, wherein said regulation of said first supply is carried out based on said soot threshold value $S_{th}$, to cause a soot oxidation in said catalytic filter based on nitrogen dioxide $NO_2$.

3. The method according to claim 1, wherein, except for time-limited special operating conditions instances for said combustion engine, said regulation of said first supply of said first additive is based on said soot threshold value $S_{th}$, wherein said first supply of said first additive results in nitrogen dioxide $NO_2$ being supplied to said catalytic filter, wherein the nitrogen dioxide $NO_2$ is used to facilitate said oxidation of soot particles in said catalytic filter.

4. The method according to claim 3, wherein said time-limited special operating conditions comprise transient operating conditions for said combustion engine.

5. The method according to claim 3, wherein said time-limited special operating conditions comprise operating modes for which said first reduction of nitrogen oxides $NO_x$ is given a higher priority than said oxidation of soot particles.

6. The method according to claim 3, wherein said time-limited special operating conditions comprise one or more of:
   operating conditions in connection with an increased power output; or
   operating conditions in connection with a cold start.

7. The method according to claim 1, wherein said regulation of said first supply of said first additive is based on said soot threshold value $S_{th}$, wherein said first supply of said first additive results in nitrogen dioxide $NO_2$ being supplied to said catalytic filter, wherein the nitrogen dioxide $NO_2$ is used to facilitate oxidation of soot particles in said catalytic filter.

8. The method according to claim 1, wherein said one or several operating conditions for said combustion engine, impacting said level of said flow for said exhaust stream, comprises one or more from the group:
   an engine speed for said combustion engine;
   a torque emitted by said combustion engine;
   a power output from said combustion engine;
   an exhaust gas recirculation level (EGR-level) for said combustion engine;
   a function for a gas exchange configuration used by said combustion engine;
   a function for an exhaust brake acting on said exhaust stream;
   a function for an inlet damper, which impacts an air intake to said combustion engine; or
   a state for said combustion engine.

9. The method according to claim 1, wherein a determination of said soot threshold value $S_{th}$ is determined based on said one or more operating conditions, in such a manner that said soot threshold value $S_{th}$ is allocated a smaller value for one or more operating conditions resulting in a higher level of said flow for said exhaust stream, and a greater value for one or more operating conditions, resulting in a lower level of said flow.

10. The method according to claim 1, wherein said level for said flow for said exhaust stream is related to an impact that said accumulation of soot has on a fuel consumption for said combustion engine.

11. The method according to claim 10, wherein said accumulation of soot has a greater impact on said fuel consumption at a high level for said flow for said exhaust stream than at a low level for said flow.

12. The method according to claim 1, wherein said regulation of said first supply and/or said regulation of said second supply depends on additional operating conditions for said combustion engine comprising one or more in the group of:
   a fuel type used to operate said combustion engine;
   a used operating mode for said combustion engine; or
   an altitude at which said combustion engine operates.

13. The method according to claim 1, wherein a determination of said soot threshold value $S_{th}$ is also based on one or more operating conditions of the exhaust treatment system from the group of:
   a state for said catalytic filter of the exhaust treatment system; or
   a state for one or more other components in the exhaust treatment system.

14. The method according to claim 1, wherein said regulation of said first supply and/or said regulation of said second supply depends on a total reduction of nitrogen oxides $NO_x$ for the exhaust treatment system.

15. The method according to claim 1, wherein a determination of said soot threshold value $S_{th}$ is also based on one or more operating conditions for a vehicle comprising said combustion engine from the group of:
   a weight for said vehicle;
   a type of use of said vehicle; or
   said vehicle being driven by a driver.

16. The method according to claim 1, wherein a determination of said soot threshold value $S_{th}$ results in a soot threshold value $S_{th}$ that is smaller than a maximum physical filling level for said catalytic filter.

17. The method according to claim 1, wherein said one or more operating conditions comprise one or more measured, modelled and/or predicted operating conditions.

18. The method according to claim 1, wherein a second oxidation of one or more of nitrogen oxides $NO_x$ and incompletely oxidized carbon compounds in said exhaust stream is carried out using a second oxidation catalyst, which is arranged downstream of said catalytic filter and upstream of said second dosage device.

19. The method according to claim 1, wherein said combustion engine is controlled to generate heat for heating of at least one of said first oxidation catalyst and said catalytic filter, to such an extent that said catalytic filter reaches a predetermined performance for conversion of nitrogen oxides $NO_x$.

20. The method according to claim 1, wherein at least one of said first supply of said first additive and said second supply of said second additive, using one of said first dosage device and said second dosage device, respectively, is regulated to increase to a level at which there is a risk of precipitates of said additive arising.

21. The method according to claim 1, wherein at least one of said first supply of said first additive and said second supply of said second additive, using said first dosage device and said second dosage device, respectively, is reduced, following which residues of at least one of said first and second additives are eliminated by heat in said exhaust stream, wherein said reduction of said supply is carried out, if the required total catalytic function for the exhaust treatment system is provided after said reduction.

22. The method according to claim 21, wherein said required catalytic function depends on currently measured, modelled and/or predicted operating conditions for said combustion engine.

23. The method according to claim 21, wherein said reduction of said supply constitutes an interruption of said supply.

24. The method according to claim 1, wherein said regulation of said first supply of said first additive is carried out based on one or several characteristics and/or operating conditions for said catalytic filter.

25. The method according to claim 1, wherein said regulation of said first supply of said first additive is carried out based also on one or more characteristics and/or operating conditions for said reduction catalyst device.

26. The method according to claim 1, wherein said regulation of said second supply of said second additive is carried out based on one or several characteristics and/or operating conditions for said reduction catalyst device.

27. The method according to claim 1, wherein said regulation of said second supply of said second additive is carried out based on one or several characteristics and/or operating conditions for said catalytic filter.

28. The method according to claim 24, wherein said characteristics for said catalytic filter, and said reduction catalyst device, respectively, are related to one or several from among the group of:
   catalytic reduction characteristics for said catalytic filter;
   catalytic reduction characteristics and oxidation characteristics for said catalytic filter;
   catalytic characteristics for said reduction catalyst device;
   a catalyst type for said catalytic filter;
   a catalyst type for said reduction catalyst device;
   a temperature interval, within which said catalytic filter is active;
   a temperature interval, within which said first reduction catalyst device is active;
   a coverage level of ammonia for said catalytic filter; or
   a coverage level of ammonia for said reduction catalyst device.

29. The method according to claim 24, wherein said operating conditions for said catalytic filter, and said reduction catalyst device, respectively, are related to one or several from among the group of:
   a representation of a temperature for said catalytic filter;
   a representation of a temperature for said reduction catalyst device;
   a representation of a temperature trend for said catalytic filter; or
   a representation of a temperature trend for said reduction catalyst device.

30. The method according to claim 1, wherein said first supply of said first additive, using said first dosage device, is regulated based also on a distribution of the ratio between nitrogen dioxide and nitrogen oxides $NO_{2\_1}/NO_{x\_1}$, upstream of said catalytic filter.

31. The method according to claim 1, wherein:
   said catalytic filter carries out a first reduction of a first amount of said nitrogen oxides $NO_{x\_1}$ reaching said catalytic filter; and
   an adaptation of a ratio $NO_{2\_1}/NO_{x\_1}$ between a first amount of nitrogen dioxide $NO_{2\_1}$ and said first amount of nitrogen oxides $NO_{x\_1}$ reaching said catalytic filter is carried out when needed, wherein an active regulation of said first amount of nitrogen oxides $NO_{x\_1}$ is carried out with engine and/or combustion measures.

32. The method according to claim 1, wherein:
   said reduction catalyst device carries out said second reduction of a second amount of said nitrogen oxides $NO_{x\_2}$ reaching said reduction catalyst device; and
   an adaptation of a ratio $NO_{2\_2}/NO_{x\_2}$ between a second amount of nitrogen dioxide $NO_{2\_2}$ and said second amount of nitrogen oxides $NO_{x\_2}$ reaching said reduction catalyst device is carried out when needed, wherein an active regulation of said first reduction of said first amount of nitrogen oxides $NO_{x\_1}$ is carried out based on a determined value $(NO_{2\_2}/NO_{x\_2})_{det}$ for said ratio $NO_{2\_2}/NO_{x\_2}$.

33. The method according to claim 32, wherein said value for said ratio $NO_{2\_2}/NO_{x\_2}$ consists of one from among the group:
   a measured value;
   a modelled value; or
   a predicted value.

34. The method according to claim 1, wherein said first oxidation catalyst, and/or said second oxidation catalyst, creates heat for components fitted downstream.

35. A computer program product comprising computer program code stored on a non-transitory computer-readable medium, said computer program product for treatment of an exhaust stream from a combustion in a combustion engine in an exhaust treatment system, said computer program product comprising computer instructions to cause one or more computer processors to perform the following operations:
   a first oxidation of compounds comprising one or more of nitrogen, carbon and hydrogen in said exhaust stream using a first oxidation catalyst;
   a regulation of a first supply of a first additive into said exhaust stream using a first dosage device in the exhaust treatment system, arranged downstream of said first oxidation catalyst, wherein application of said first supply is regulated to thereby prevent an accumulation of soot that exceeds a soot threshold value $S_{th}$ in a catalytic filter, arranged downstream of said first dosage device, wherein said soot threshold value $S_{th}$ is determined based on at least one or more operating conditions for said combustion engine, impacting a level of a flow for said exhaust stream;
   a first reduction of nitrogen oxides $NO_x$ in said exhaust stream using reduction characteristics in an at least partly catalytic coating comprised in said catalytic filter, and using said first additive;
   a catching and oxidizing of soot particles in said exhaust stream using said catalytic filter;
   a regulation of a second supply of a second additive into said exhaust stream using a second dosage device, arranged downstream of said catalytic filter; and a second reduction of nitrogen oxides $NO_x$ in said exhaust stream, using at least one of said first and said second additive in a reduction catalyst device, arranged downstream of said second dosage device.

36. An exhaust treatment system arranged for treatment of an exhaust stream, which results from a combustion in a combustion engine, said system comprising:
a first oxidation catalyst, arranged to oxidize compounds comprising one or more of nitrogen, carbon, and hydrogen in said exhaust stream;
a first dosage device arranged downstream of said first oxidation catalyst;
a catalytic filter, arranged downstream of said first dosage device, said catalytic filter comprising an at least partly catalytic coating comprised in said catalytic filter;
at least one computer processor configured for regulation of a first supply of a first additive into said exhaust stream using the first dosage device, wherein application of said first supply is regulated to thereby prevent an accumulation of soot that exceeds a soot threshold value $S_{th}$ in the catalytic filter, wherein said soot threshold value $S_{th}$ is determined based on at least one or more operating conditions for said combustion engine, impacting a level of a flow for said exhaust stream;
a first reduction of nitrogen oxides $NO_x$ in said exhaust stream using reduction characteristics of the at least partly catalytic coating comprised in said catalytic filter and using said first additive;
a catching and oxidizing of soot particles in said exhaust stream using said catalytic filter;
a second dosage device, arranged downstream of said catalytic filter;
said at least one processor configured for regulation of a second supply of a second additive into said exhaust stream using the second dosage device; and
a reduction catalyst device, arranged downstream of said second dosage device, wherein a second reduction of nitrogen oxides $NO_x$ in said exhaust stream is performed, using at least one of said first and said second additive in said reduction catalyst device.

37. The exhaust treatment system according to claim 36, wherein said regulation of said supply is arranged to be carried out based on said soot threshold value $S_{th}$, in such a manner that a required soot oxidation based on nitrogen dioxide $NO_2$ is obtained in said catalytic filter.

38. The exhaust treatment system according to claim 36, wherein, except for time-limited special operating conditions instances for said combustion engine, said regulation of said first supply of said first additive is based on said soot threshold value $S_{th}$, wherein said first supply of said first additive results in nitrogen dioxide $NO_2$ being supplied to said catalytic filter, wherein the nitrogen dioxide $NO_2$ is used to facilitate said oxidation of soot particles in said catalytic filter.

39. Theme exhaust treatment system according to claim 38, wherein said time-limited special operating conditions comprise transient operating conditions for said combustion engine.

40. The exhaust treatment system according to claim 38, wherein said time-limited special operating conditions comprise operating modes for which said first reduction of nitrogen oxides $NO_x$ is given a higher priority than said oxidation of soot particles.

41. The exhaust treatment system according to claim 38, wherein said time-limited special operating conditions comprise one or more of:
operating conditions in connection with increased power output; or
operating conditions in connection with a cold start.

42. The exhaust treatment system according to claim 36, wherein said regulation of said first supply of said first additive is based on said soot threshold value $S_{th}$, wherein said first supply of said first additive results in nitrogen dioxide $NO_2$ being supplied to said catalytic filter, wherein the nitrogen dioxide $NO_2$ is used to facilitate oxidation of soot particles in said catalytic filter.

43. The exhaust treatment system according to claim 36, wherein said operating conditions for said combustion engine consist of currently measured, modelled and/or predicted operating conditions for said combustion engine.

44. The exhaust treatment system according to claim 36, also comprising:
a second oxidation catalyst, which is arranged downstream of said catalytic filter and upstream of said second dosage device, and which is arranged to oxidize one or more of nitrogen oxide NO and incompletely oxidized carbon compounds in said exhaust stream.

45. The exhaust treatment system according to claim 36, wherein at least one of said first and second additives comprises ammonia, or a substance from which ammonia may be extracted and/or released.

46. The exhaust treatment system according to claim 36, wherein said reduction catalyst device comprises one from among the group of:
a selective catalytic reduction catalyst (SCR);
a selective catalytic reduction catalyst (SCR) integrated downstream with a slip-catalyst (SC), wherein said slip-catalyst (SC) is arranged to oxidize a residue of additive and/or arranged to assist said selective catalytic reduction catalyst (SCR) with an additional reduction of nitrogen oxides $NO_x$ in said exhaust stream;
a selective catalytic reduction catalyst (SCR) followed downstream by a separate slip-catalyst (SC), wherein said slip-catalyst (SC) is arranged to oxidize a residue of additive and/or to assist said selective catalytic reduction catalyst (SCR) with an additional reduction of nitrogen oxides $NO_x$ in said exhaust stream; or
a slip-catalyst (SC), arranged to oxidize a residue of additive and/or to carry out a reduction of nitrogen oxides $NO_x$ in said exhaust stream.

47. The exhaust treatment system according to claim 36, wherein said at least partly catalytic coating with reduction characteristics in said catalytic filter is arranged in connection with an inlet in said catalytic filter, and has reduction characteristics corresponding to the reduction characteristics in a selective catalytic reduction catalyst (SCR).

48. The exhaust treatment system according to claim 36, wherein said at least partly catalytic coating with reduction characteristics in said catalytic filter is arranged in connection with an outlet in said catalytic filter, and has reduction characteristics corresponding to the reduction characteristics in a selective catalytic reduction catalyst (SCR).

49. The exhaust treatment system according to claim 36, wherein said at least partly catalytic coating with reduction characteristics in said catalytic filter is arranged substantially over the entire length of said catalytic filter, and has reduction characteristics corresponding to the reduction characteristics in a selective catalytic reduction catalyst (SCR).

50. The exhaust treatment system according to claim 36, wherein a slip-catalyst (SC) is arranged in connection with an outlet in said catalytic filter, wherein said slip-catalyst (SC) is arranged to oxidize a residue of additive and/or to assist said at least partly catalytic coating with an additional reduction of nitrogen oxides $NO_x$ in said exhaust stream.

51. The exhaust treatment system according to claim 36, wherein said first oxidation catalyst is arranged to generate heat for components fitted downstream.

52. The exhaust treatment system according to claim 36, wherein said at least partly catalytic coating comprised in said catalytic filter also has oxidizing characteristics.

53. The exhaust treatment system according to claim 36, wherein said at least one processor is configured to determine said soot threshold value $S_{th}$ based on said one or more operating conditions, in such a manner that said soot threshold value $S_{th}$ is allocated a smaller value for one or more operating conditions resulting in a higher level of said flow, and a greater value for one or more operating conditions resulting in a lower level of said flow.

54. The exhaust treatment system according to claim 36, wherein said at least one processor is configured to determine said soot threshold value $S_{th}$ also based on one or more operating conditions for the exhaust treatment system, the operating conditions comprising one or more from the group of:
- a state for said catalytic filter; or
- a state for one or more other components in the exhaust treatment system.

* * * * *